(12) United States Patent
Clark, Jr. et al.

(10) Patent No.: US 9,963,871 B2
(45) Date of Patent: May 8, 2018

(54) BUILDING PANEL CONNECTOR

(71) Applicant: COMPOSITE BUILDING SYSTEMS, INC., Pasadena, CA (US)

(72) Inventors: Paul M. Clark, Jr., Pasadena, CA (US); Brian J. Blonski, Yardley, PA (US)

(73) Assignee: Composite Building Systems, Inc., Pasadena, CA (US)

( * ) Notice: Subject to any disclaimer, the term of this patent is extended or adjusted under 35 U.S.C. 154(b) by 0 days. days.

(21) Appl. No.: 14/918,247

(22) Filed: Oct. 20, 2015

(65) Prior Publication Data
US 2017/0022700 A1 Jan. 26, 2017

Related U.S. Application Data

(63) Continuation-in-part of application No. 14/213,270, filed on Mar. 14, 2014, now Pat. No. 9,175,705.

(60) Provisional application No. 61/792,364, filed on Mar. 15, 2013, provisional application No. 61/785,854, filed on Mar. 14, 2013.

(51) Int. Cl.
*E04B 1/41* (2006.01)
*E04C 2/04* (2006.01)
*E04C 3/294* (2006.01)
*E02D 29/14* (2006.01)
*E04B 5/17* (2006.01)
*F16B 5/12* (2006.01)
*F16B 7/22* (2006.01)

(52) U.S. Cl.
CPC ............ *E04B 1/41* (2013.01); *E02D 29/14* (2013.01); *E04C 2/044* (2013.01); *E04C 3/294* (2013.01); *E04B 1/4121* (2013.01); *E04B 2001/4192* (2013.01); *E04B 2005/176* (2013.01); *F16B 5/12* (2013.01); *F16B 7/22* (2013.01)

(58) Field of Classification Search
CPC .. E04B 1/41; E04B 1/4121; E04B 2001/4192; E04B 2005/176; E04F 13/045; E04C 3/294
USPC .......................................... 52/334, 414, 680
See application file for complete search history.

(56) References Cited

U.S. PATENT DOCUMENTS

| | | | | |
|---|---|---|---|---|
| 1,768,626 A | * | 7/1930 | Pedersen | ............... E04B 5/29 52/333 |
| 4,741,138 A | * | 5/1988 | Rongoe, Jr. | ............ E04B 1/164 52/334 |
| 5,402,616 A | | 4/1995 | Klein | |
| 5,414,972 A | | 5/1995 | Ruiz et al. | |
| 5,592,796 A | | 1/1997 | Landers | |
| 5,688,428 A | | 11/1997 | Maguire | |
| 6,125,608 A | | 10/2000 | Charlson | |
| 6,185,897 B1 | | 2/2001 | Johnson et al. | |
| 6,729,094 B1 | * | 5/2004 | Spencer | ............... E04B 5/10 52/334 |
| 6,761,007 B2 | | 7/2004 | Lancelot, III et al. | |

(Continued)

*Primary Examiner* — Robert Canfield
(74) *Attorney, Agent, or Firm* — Knobbe Martens Olson & Bear LLP

(57) ABSTRACT

A connector assembly is used to secure a building panel (e.g., building panel) to a building structural element. The connector assembly can be formed of structural materials to effectively transfer load between the panel and the structural element. The connector assembly can include one or more insulating materials to reduce heat transfer between the panel and the structural element.

15 Claims, 36 Drawing Sheets

(56) References Cited

U.S. PATENT DOCUMENTS

| | | | |
|---|---|---|---|
| 6,837,013 B2 * | 1/2005 | Foderberg | B28B 23/005 52/320 |
| 6,996,945 B2 | 2/2006 | Doty | |
| 7,028,439 B2 | 4/2006 | Foderberg et al. | |
| 7,412,805 B2 | 8/2008 | Parrish | |
| 7,475,862 B1 | 1/2009 | Anspach | |
| 7,779,590 B2 * | 8/2010 | Hsu | E04B 5/40 52/328 |
| 7,870,702 B2 | 1/2011 | McKay | |
| 8,109,706 B2 | 2/2012 | Richards | |
| 8,601,763 B2 | 12/2013 | Bui | |
| 8,661,754 B2 * | 3/2014 | Hsu | E04B 5/40 52/289 |
| 8,776,468 B2 | 7/2014 | Henriquez | |
| 2003/0140590 A1 | 7/2003 | Lancelot, III et al. | |
| 2005/0120668 A1 * | 6/2005 | Hage-Chahine | E04B 5/29 52/831 |
| 2012/0137619 A1 | 6/2012 | Martter | |
| 2012/0233956 A1 | 9/2012 | Fey | |

* cited by examiner

SECTION A-A

Section "C-C"

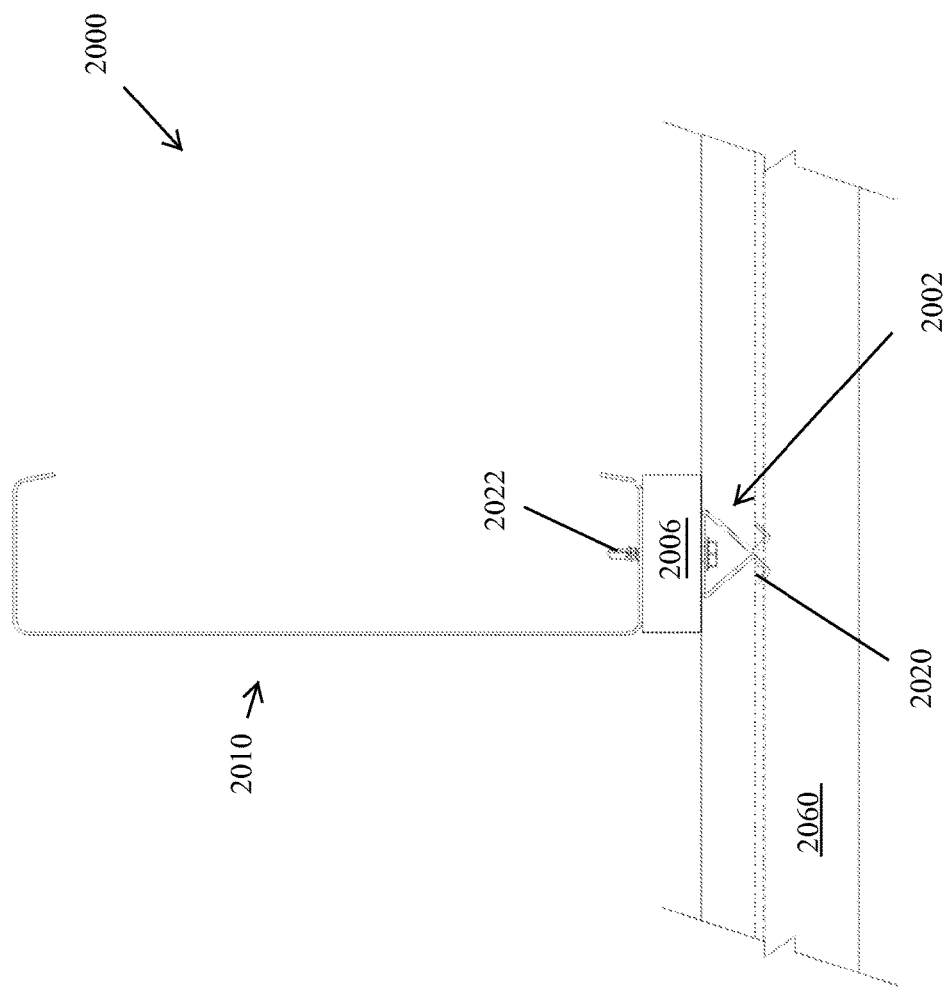

BUILDING PANEL CONNECTOR

CROSS-REFERENCE TO RELATED APPLICATIONS

This application is a continuation-in-part of U.S. patent application Ser. No. 14/213,270, filed Mar. 14, 2014, (entitled "CONCRETE PANEL CONNECTOR"), which claims the benefit of U.S. Provisional Patent Application No. 61/785,854, filed Mar. 14, 2013, (entitled "CONCRETE PANEL CONNECTOR") and U.S. Provisional Patent Application No. 61/792,364, filed Mar. 15, 2013, (entitled "CONCRETE PANEL CONNECTOR"), the entire disclosures of which are hereby incorporated by reference. Any and all priority claims identified in the Application Data Sheet, or any correction thereto, are hereby incorporated by reference under 37 CFR 1.57.

BACKGROUND OF THE INVENTION

Field of the Invention

Thermal insulation is an important consideration in the choice of materials and design of apparatuses used for the construction of buildings. Generally, building panels often form the exterior surface of a building and are therefore in direct contact with ambient conditions outside of the building. Structural members, on the other hand, often form parts of the interior surface of a building and are therefore in direct contact with ambient conditions inside the building. It can often be the case that conditions within the building, such as temperature, are significantly different from conditions outside the building. For example, building panels gain heat on hot sunny days and transfer that heat into the building largely through the structural members. Conversely, on cold cloudy days, heat flows from the building interior into building panels, largely through the structural members, and then is lost to the cold exterior. Both scenarios result in additional energy expenditures on heating, ventilation and air condition systems to maintain workable conditions within the building. Therefore, it is important that buildings have thermal insulation and structural members that limit thermal bridging to reduce such energy expenditures.

SUMMARY

Embodiments of the present disclosure generally relate to shear connectors configured to connect building panels (e.g., concrete panels) to structural members of a building structure. The shear connectors can be manufactured at least in part using insulating materials configured to reduce thermal transfer between building panels and structural members to which the connectors will be attached. Wall assemblies including shear connectors described herein will, in some embodiments, have lower thermal transmittance or U-Value compared to traditional construction methods and systems. The shear connectors can be used to chair up and mechanically link reinforcing mesh in the building panel to the panel's structural members.

In some embodiments, the base of the connectors directly contact the building panel and the structural member. In such embodiments, the building panel, connector, and structural member advantageously create a composite construction such that the composite construction can be used for a shear wall. On the other hand, if further (e.g., non-structural) insulating layers are interposed between the base of the connector and the building panel, the resultant construction can be used for cladding but not as a shear wall. Thus, having a connector with sufficient insulating properties is more desirable than simply placing a layer of insulation (e.g., non-structural insulation) between the connector base and a building panel.

In some configurations, the wall assembly consists of the shear connector, a building panel (e.g., about 2 inches or about 2.5 inches thick concrete or other material), and a structural component (e.g., a 4 inch, 6 inch, or 8 inch C-section steel member). In some configurations, the wall assembly consists of the shear connector, the building panel (e.g., about 2 inches or about 2.5 inches thick concrete or other material), the structural component (e.g., a 4 inch, 6 inch, or 8 inch C-section steel member) and a drywall covering. In some configurations, the wall assembly comprises the shear connector, a building panel (e.g., about 2 inches or about 2.5 inches thick), and a structural component (e.g., a 4 inch, 6 inch, or 8 inch C-section steel member) in which the shear connector is in direct contact with the building panel (e.g., no intervening insulation between the shear connector and the building panel).

In some embodiments, shear connector assemblies of the present disclosure are configured to improve the energy efficiency of precast wall panel systems. For example, the connector assemblies can be configured to reduce thermal bridging between exterior panels (e.g., building panels) and interior wall framing. In some configurations, the shear connector assemblies provide space for conventional wall insulation to be used.

The connector assemblies of the present disclosure can include connector strips. The connector strips can be positioned between a spacer system and the exterior panels of the structure. In some embodiments, the connector strips are constructed from steel or other metals, rigid materials, or semi-rigid materials. The connector strips can include hooks. The hooks can be alternating. In some embodiments, the hooks provide multiple chair positioned for a reinforcing mesh within the building panel (e.g., a concrete panel).

The spacer system can utilize low thermal conductivity load bearing supports. The supports can be constructed from a non-combustible material such as, for example, cementitious materials.

In some configurations, the spacer systems include an insulative strip. The insulative strips can be constructed from a foam such as, for example, a rigid or semi-rigid foam. The insulative strips can include apertures configured to accommodate supports. In some embodiments, the insulative strips and/or supports are sized to cover all or substantially all of the steel framing as observed from the connector strips. The insulative strips can be configured to limit conductive and/or radian heat transfer through the shear connector assembly and between the building panels and interior wall framing.

The spacer systems of the present disclosure can offset the exterior building panels from the steel framing. In some embodiments, offsetting the exterior panels from the framing can increase wall thickness. In some cases, offsetting the panels from the framing can provide additional space for insulation to improve the energy efficiency of the walls.

According to some variants, a shear connector assembly for attaching a structural member to a building panel can include a connector strip. The connector strip can include a first connector strip face and a second connector strip face opposite the first connector strip face. In some embodiments, the connector strip comprises one or more apertures extending through the connector strip in a direction perpendicular to the first connector strip face. In some configurations, the connector strip includes one or more hooked members extending from the first connector strip face. In some embodiments, the shear connector assembly includes an insulative strip. The insulative strip can include a first insulative strip face in contact with at least a portion of the second connector strip face. In some embodiments, the insulative strip includes a second insulative strip face opposite the first insulation strip face. The insulative strip can include one or more apertures extending through the insulative strip in a direction substantially perpendicular to the first insulation strip face. In some embodiments, the shear connector assembly includes one or more support members located within the insulative strip apertures. The one or more support members can include: a first support face in contact with at least a portion of the second connector strip face; a second support face opposite the first support face; and/or a thickness in a direction perpendicular to the first support face. In some embodiments, the shear connector assembly includes one or more fasteners configured to connect the connector assembly to the structural member, the one or more fasteners extending through the one or more apertures of the connector strip such that at least a portion of the second support face contacts the structural member.

In some configurations, the connector strip comprises fiber reinforced composite material.

In some configurations, the insulative strip has a thermal conductivity less than 0.60 W/m·° K.

In some configurations, the insulative strip comprises rigid foam with a thermal conductivity less than 0.10 W/m·° K.

In some configurations, the insulative strip comprises fiber reinforced composite material.

In some configurations, the one or more support members have a thermal conductivity less than 1.0 W/m·° K.

In some configurations, the one or more support members have a compressive strength parallel to the thickness direction greater than 1000 pounds per square inch.

In some configurations, the one or more support members comprise cementitious material.

In some configurations, the cementitious material has a density less than 130 pounds per cubic foot.

In some configurations, the one or more support members comprise fiber reinforced composite material.

In some configurations, the one or more support members have an aperture extending through the thickness of the one or more support members in a direction perpendicular to the support first face.

In some configurations, the one or more fasteners pass through the aperture of the one or more support members.

In some configurations, the shear connector assembly has a first end, a second end, and a length extending from the first end to the second end. In some configurations, the one or more support members cover less than 75% of a surface area of a length of the structural member overlapped by the length of the shear connector assembly as observed from a perspective perpendicular to a connecting flange of the structural member.

In some configurations, the one or more fasteners extend through the one or more support members.

In some configurations, each of the one or more fasteners do not extend through the one or more support members.

In some configurations, the shear connector assembly has a first end, a second end, and a length extending from the first end to the second end. In some configurations, the one or more support members and insulative strip collectively overlap substantially an entire portion of a length of the shear connector overlapped by the length of assembly support member as observed from a perspective perpendicular to the second connector strip face and toward the support member. In some embodiments, the support member and insulative strip collectively overlap substantially the entire support member as observed from a perspective perpendicular to the second connector strip face and toward the support member.

In some configurations, the connector strip includes one or more engagement features extending form the second strip face toward the one or more support members. In some configurations, the one or more support members couple with a portion of the engagement features.

According to some variants, a shear connector assembly for attaching a structural member to a building panel includes a connector strip. The connector strip can include a first strip face and a second strip face opposite the first strip face. In some embodiments, the connector strip includes one or more apertures extending through the connector strip in a direction perpendicular to the first strip face. The shear connector assembly can include one or more hooked members extending from the first strip face. In some embodiments, the shear connector includes one or more support members. The one or more support members can include a first support face in contact with at least a portion of the second strip face. In some embodiments, the one or more support members include a second support face opposite the first support face and contacting the structural member. In some embodiments, the cone or more support members have a thickness in a direction perpendicular to the first support face.

In some configurations, the connector strip comprises fiber reinforced composite material.

In some configurations, the one or more support members have a thermal conductivity less than 1.0 W/m·° K.

In some configurations, the one or more support members have a compressive strength parallel to the thickness direction greater than 1000 pounds per square inch.

In some configurations, the one or more support members comprise cementitious material.

In some configurations, the cementitious material has a density less than 130 pounds per cubic foot.

In some configurations, the one or more support members comprise fiber reinforced composite material.

In some configurations, the one or more support members have an aperture extending through the thickness of the one or more support members in a direction perpendicular to the support first face.

In some configurations, the one or more fasteners pass through the support aperture.

In some configurations, the shear connector assembly has a first end, a second end, and a length extending from the first end to the second end. In some configurations, the one or more support members cover less than 75% of a surface area of a length of the structural member overlapped by the length of the shear connector assembly as observed from a perspective perpendicular to the second connector strip face and toward the support member.

In some configurations, the connector strip includes one or more engagement features extending form the second strip face toward the one or more support members. In some configurations, the one or more support members couple with a portion of the engagement features.

A method of connecting a shear connector assembly to a structural member can include providing a shear connector assembly. The shear connector assembly can have a connector strip having a first face and a second face opposite the first face, the connector strip including one or more hooks extending from the second face. In some cases, the shear connector assembly includes one or more of a length of the structural member overlapped by the length of the shear connector assembly as observed having a first face and a second face opposite the first face. The method can include connecting the first face of the one or more of a length of the structural member overlapped by the length of the shear connector assembly as observed to the second face of the connector strip. In some embodiments, the method includes connecting the connector strip to the structural member such that the second face of the one or more of a length of the structural member overlapped by the length of the shear connector assembly as observed contacts a surface of the structural member.

In some cases, the method includes passing a fastener through the connector strip and a portion of the structural member.

In some cases, the method includes passing the fastener through one of the one or more support members.

In some embodiments, the method includes chairing a mesh within a concrete slurry, the chairing of the mesh including coupling one or more of the one or more hooks with the mesh and pouring a building material onto and around the mesh.

In some cases, the method includes positioning an insulative strip between the one or more of a length of the structural member overlapped by the length of the shear connector assembly as observed in a direction parallel to the second face of the connector strip.

BRIEF DESCRIPTION OF THE DRAWINGS

These and other features, aspects and advantages of the present invention will now be described with reference to the drawings of several embodiments, which embodiments are intended to illustrate and not to limit the invention, and in which figures:

FIG. 21A is an end view shear connector assembly of FIG. 19 wherein the connector strip is at least partially embedded in a building panel.

DETAILED DESCRIPTION OF PREFERRED EMBODIMENTS

Single Hook Shear Connector

Figure 1:
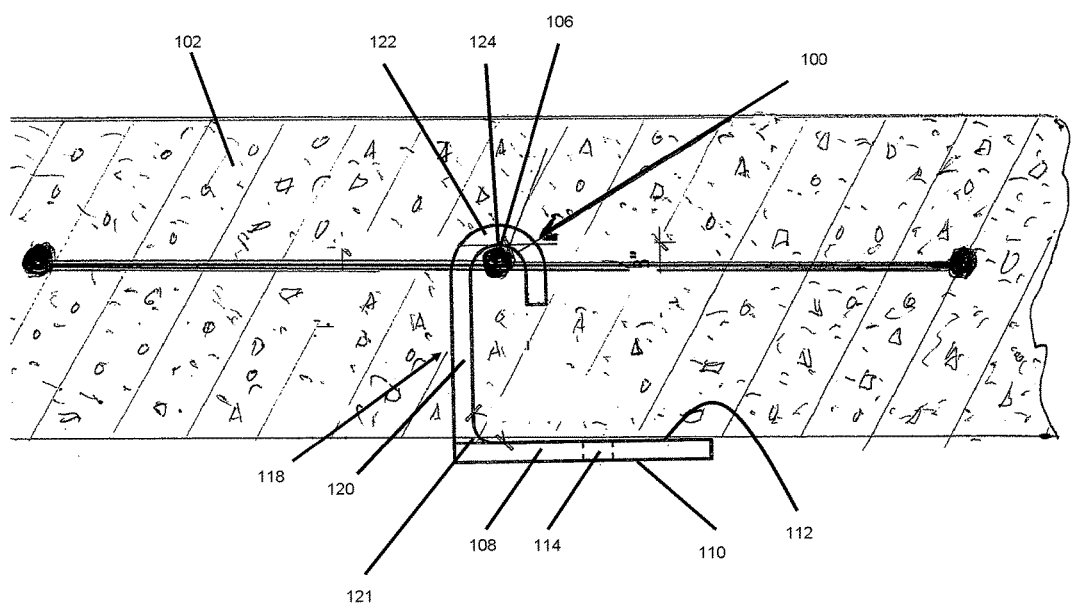
FIG. 1 is a side sectional view of an embodiment of a single-hook shear connector embedded in a building panel.
Figure 2:
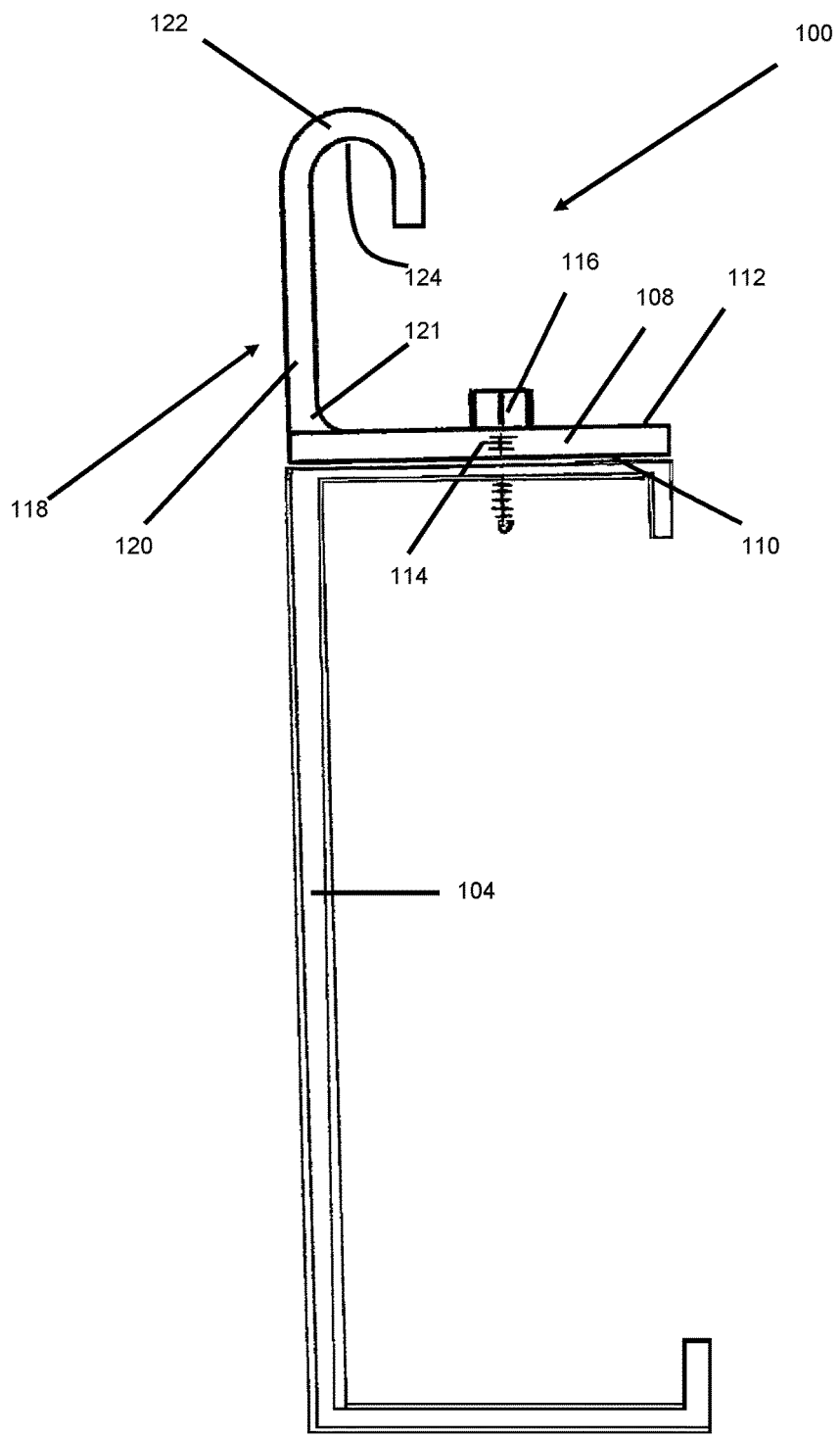
FIG. 2 is a side sectional view of the shear connector of FIG. 1 connected to a structural member.
Figure 3:
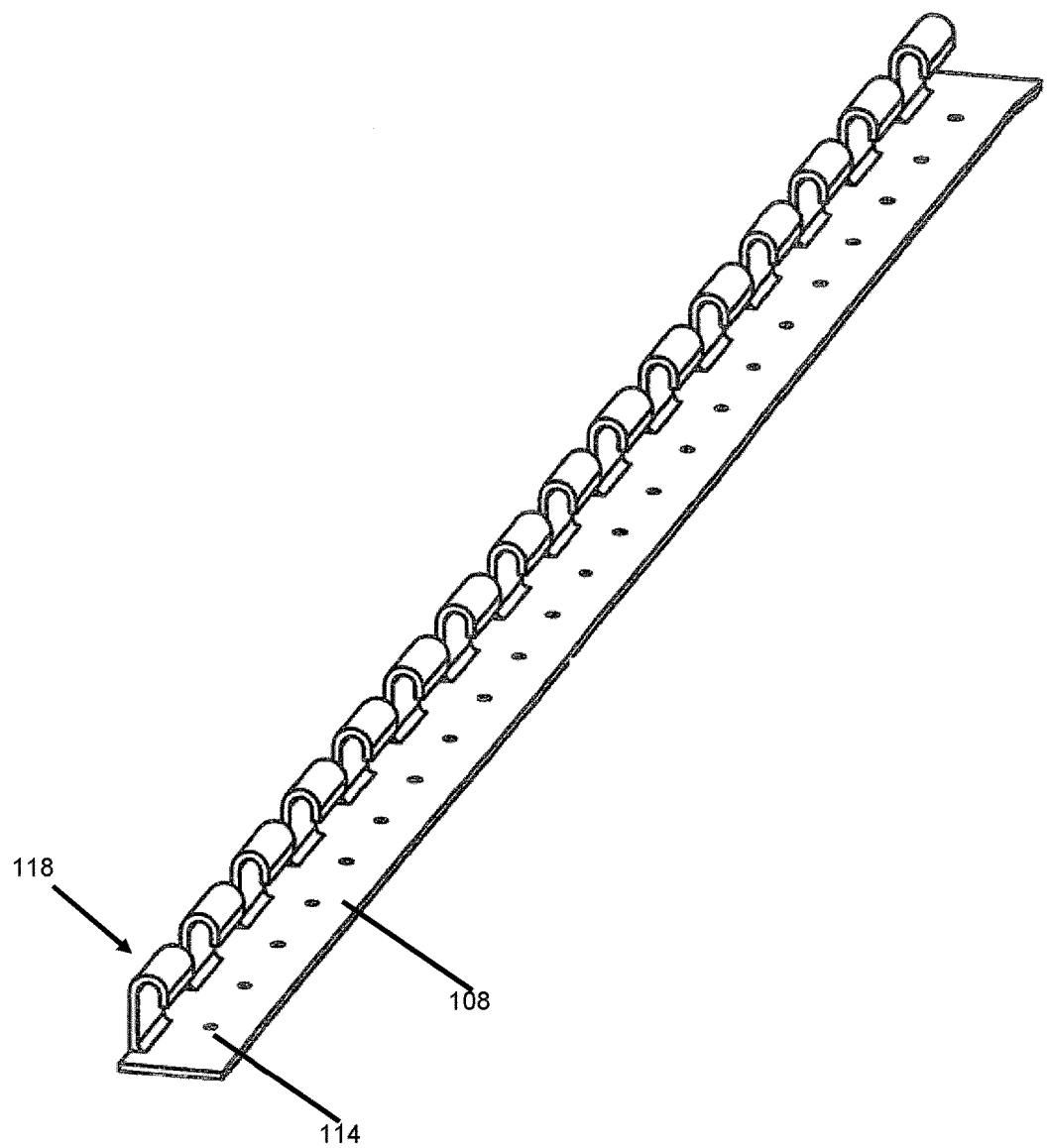
FIG. 3 is a perspective view of the shear connector of FIG. 1.

FIGS. 1-3 are illustrations of an embodiment of a shear connector 100 that is configured to serve as an insulating attachment mechanism between a building panel 102 and a structural member 104. The shear connector 100 can be configured to transfer structural loads and limit heat flow between the building panel 102 and the structural member 104. In some embodiments, such as that illustrated in FIG. 1, the building panel 102 can be manufactured from composite materials or cementitious materials, such as concrete. Furthermore, in some embodiments, such as that illustrated in FIG. 2, the attached structural member 104 can be a c-shaped stud or any other structural element used in the construction industry. At least a portion of the shear connector 100 can be configured to be embedded within the building panel 102. The process of embedding the shear connector 100 within the panel 102 can occur at the time the panel 102 is being formed. For example, in the illustrated embodiment, at least a portion of an extension portion 120 of the shear connector 100 is placed within a casting bed for concrete. The extension portion 120 chairs up the reinforcing mesh 106 while the concrete is being poured such that, when cured into a building panel 102, at least a portion of the shear connector 100 is embedded within the panel 102 and chairs up the reinforcing mesh 106.

The entirety of the shear connector 100 can be manufactured from a variety of materials such as, but not limited to, fiber reinforced polymer composite materials, such as glass fiber reinforcement in a vinyl ester resin matrix, which have advantageous characteristics suitable for building materials. For example, such materials are non-corrosive and rust resistant. Furthermore, such composites generally have generally high thermal resistance thereby reducing thermal transfer through the shear connector 100. The use of shear connectors constructed at least in part from insulating material can reduce thermal conduction between the mesh (e.g., mesh 106) and the structure (e.g., structural member 104). As such, due to the advantageous design of the shear connector 100, discussed in further detail below, as well as the use of advantageous materials, thermal transfer between the structural member 104 and the building panel 102 can be significantly reduced, thereby significantly reducing the U-value of the system (e.g., concrete, stud, connector and possibly inner surface skin), to meet or exceed the more stringent requirements of today's building codes. Furthermore, the shear connector 100 can be manufactured using methods, such as pultrusion, to form the general body shape and subsequently milling the pultruded part to achieve the desired shape. The shear connector 100 can also be manufactured by molding the part into the desired shape.

FIG. 1 is a front section view of the shear connector 100, which is shown embedded within the building panel 102. At a first end of the device, the shear connector 100 has a generally planar rectangular base 108 with an outside surface 110 and an inside surface 112. The shear connector 100 is configured to be attached directly to the structural member 104. The shear connector 100 generally has a width that corresponds to the width of the structural member 104 attached thereto. In some embodiments, the width of the shear connector 100 is greater than or less than the width of the structural member 104 attached thereto. In the illustrated embodiment, the base 108 of the shear connector 100 has a width of one and five-eighths of an inch (1⅝") and a length of four feet (4'). Desirably, the shear connector 100 is sized cover the entire width (i.e., in transverse section extending normally across a length of the member) of a flange of the structural member The outside surface 110 is configured to be placed adjacent to and in contact with the structural member 104. As such, in order to attach the base 108 with the structural member 104, the base 108 has multiple apertures 114 throughout the length of the base 108 configured to allow a fastener 116, such as a structural screw (as shown in FIG. 2), to pass therethrough. The number and size of the apertures 114 as well as the spacing of the apertures 114 can be dictated by performance characteristics desired for that particular building in that particular region. For example, in areas where the structural member 100 may be subject to significant forces, more apertures 114 (e.g., more fasteners 116) may be used to distribute these forces more evenly across the base 108 of the shear connector 100 whereas, in other areas, fewer apertures 114 may be used to reduce the amount of labor, and thereby costs, associated with assembly of the shear connector 100 and structural members 104. In some embodiments, apertures 114 are equally spaced at intervals of about two inches (2"), about four inches (4"), or about six inches (6"). In the illustrated embodiment, the apertures 114 are spaced at intervals of about two inches (2"), have a diameter of about three-sixteenths of an inch (³⁄₁₆"), and are about five-eighths of an inch (⅝") from the edge opposite the hooked arms 118.

As illustrated in the embodiment shown in FIG. 1, the inside surface 112 of the base 108 can be placed adjacent to and in contact with the building panel 102. In some embodiments, the inside surface 112 is spaced from the building material. In such embodiments, an insulating material with low thermal conductivity, such as spray-on foam or spray-on fiberglass, can be used to fill in the gap between the building panel 102 and the inside surface 112 of the base 108. As such, the inside surface 112 can be placed adjacent the insulating material rather than the building panel 102. This separation provides the additional benefit of reducing thermal transfer through the shear connector 100 by introducing an additional insulating element between the inside surface 112 and the building panel 102. As such, the U-value of the system can be further increased.

The thickness of the base 108, defined as the distance between the outside surface 110 and the inside surface 112, is chosen based on factors such as, but not limited to, the desired U-value of the assembly and manufacturing costs. Increasing the thickness of the base 108 advantageously reduces the thermal transfer further and therefore reduces the U-value of the system. In some embodiments, the thickness of the base 108 can range from about one-sixteenth of an inch (¹⁄₁₆") to upwards of an inch (1") or more. In the illustrated embodiment, the thickness of the base of about one-eighth (⅛") of an inch. However, in embodiments where the base 108 is spaced from the building panel 102, the thickness can advantageously be reduced due to the reduction of thermal transfer associated with use of an additional insulating material between the base 108 and the building panel 102 provided that the additional insulating material has a low or lower thermal conductivity than the shear connector 100.

With continued reference to FIG. 1, at a second end of the device, the shear connector 100 has multiple hooked arms 118 configured to be embedded within the building material 102 to provide a substantially stable and secure attachment of the structural member 104 to the building material 102. In the illustrated embodiment, the base 108 and the hooked arms 118 form a single, integral unit. The hooked arms 118 of the shear connector 100 have an extension portion 120 that, at a first end, extends from the inside surface 112 of the base 108 in a direction perpendicular to the inside surface 112 along the edge of the inside surface 112. The angle at which the extension portion 120 extends from the inside surface 112 can vary depending on the application. A fillet 121 can placed along the inside surface 112 to reduce localized stresses and reduce the possibility of failure at this point of the shear connector 100 if a significant force is applied. At a second end, the hooked arms 118 have a hooked member 122. The length of the hooked arm 118, defined as the distance between the inside surface 112 and the uppermost portion of the inside surface 124 of the hooked member 122, can be chosen based upon the desired placement of the shear connector 100 within the building panel 102 and the desired thermal transfer characteristics between the building panel 102 and the structural member 104. For example, the length may be increased in embodiments where it is desired that the base 108 be separated from the building panel 102 or the shear connector 100 is adjusted such that the hooked arms 118 are placed closer to the bottom surface of the building panel. In some embodiments, the length of the hooked arm 118 can range from about one inch (1") to about two inches (2"). In the illustrated embodiment, the length of the hooked arm is about one and a quarter inches (1¼"). Furthermore, spacing of the multiple hooked arms 118 can be chosen based upon factors, such as, but not limited to, the spacing between parallel wires of the reinforcing mesh 106. In typical industrial applications, the spacing of these parallel wires are normally either four inches (4") or (6"). Therefore, in the illustrated embodiment, the spacing of the multiple hooked arms 118 is about two inches (2") so that no hooked member interferes with the reinforcing mesh 106. In some embodiments, the hooked arm 118 of the shear connector 100 can be located between the edges of the inside surface 112, such as midway across the base 108. Positioning the extension portion 120 closer to the fasteners 116 may be advantageous in cases of high structural loads.

At the other end of the extension portion 120 is a hooked member 122 that is configured to provide additional stability and strength to the attachment between the shear connector 100 and the building panel 102. In particular, the hooked member 122 significantly increases what is termed in the industry as the "pull-out strength" of the shear connector 100 (i.e., the amount of force necessary to remove the shear connector 100 from the building panel 102 after the shear connector 100 has been embedded within the building panel 102). As should be apparent, the "pull out strength" is a significantly important parameter in the design of building materials because it is highly desirable and advantageous that the structural members 104 not be easily removed from building panels 102. This parameter is particularly relevant in instances where significant forces are applied to the building panels 102 and the structural members 104, which tend to pull the panels and the members apart, such as during an earthquake.

As viewed in FIG. 1, the hooked member 122 extends in a horizontal direction into the building panel 102, which is generally perpendicular to the direction of force (i.e., vertical) applied when attempting to remove the shear connector 100 from the building panel. As such, by extending into the building panel 102 in this way, the hooked member 122 increases the interface between the shear connector 100 and the building panel 102, thereby allowing the hooked member 122 to transfer a substantial amount of the force applied to the shearing connector 100 to the building panel 102. This act of transferring additional force into the building panel 102 reduces the likelihood that the shear connector 100 will be removed from the building panel 102 when a significant force is applied.

Additionally, in the illustrated embodiment, the hooked member 122 has a generally U-shaped cross-sectional area that is configured to chair up a reinforcing mesh 106. As viewed in FIG. 1, the reinforcing mesh 106, which is a substantially planar grid of wires embedded within the building panel 102, extends throughout the panel 102 in both the horizontal direction and in the direction running into and out of the page of FIG. 1 (not shown). The mesh 106 not only provides additional strength to the building panel 102 by potentially placing the building material in compression but can also advantageously be used to increase the "pull out strength" of the shear connector 100 even further. When the shear connector 100 and the mesh 106 are coupled together when embedded within the building material 102 such that the inside surface 124 of the hooked member 122 is adjacent to and, in some cases, in direct contact with the mesh 106, the mesh 106 distributes forces applied by the hooked member 122 across the entire portion of the building panel 102 in which the mesh 106 is embedded. This distribution of force of the localized force from the hooked member 122 thereby additionally increases the "pull out strength" of the shear connector by reducing the likelihood of failure of the building panel 102.

As such, the radius of the hooked member is based on, among other factors, the desired amount of "pull-out strength," the radius of the wires in the reinforcing mesh 106, and the costs of manufacture. In some embodiments, the radius of the hooked member can range from about one-eighths of an inch (⅛") to about an inch (1"). In some embodiments, the radius of the hooked member can range from about one-sixths of an inch (⅙") to one three-quarters of an inch (¾"). In some embodiments, the radius of the hooked member can range from about one-quarter of an inch (¼") to about one-half of an inch (½"). In the illustrated embodiment, the radius of the hooked member is about one-quarter of an inch (¼"). Additionally, the hooked member 122 may have an extended member 120 that provides the additional advantage of facilitating chairing up the mesh 106 with the hooked member 122 during the process of embedding both elements within the building panel 102.

Double Hook Shear Connector

Figure 4:
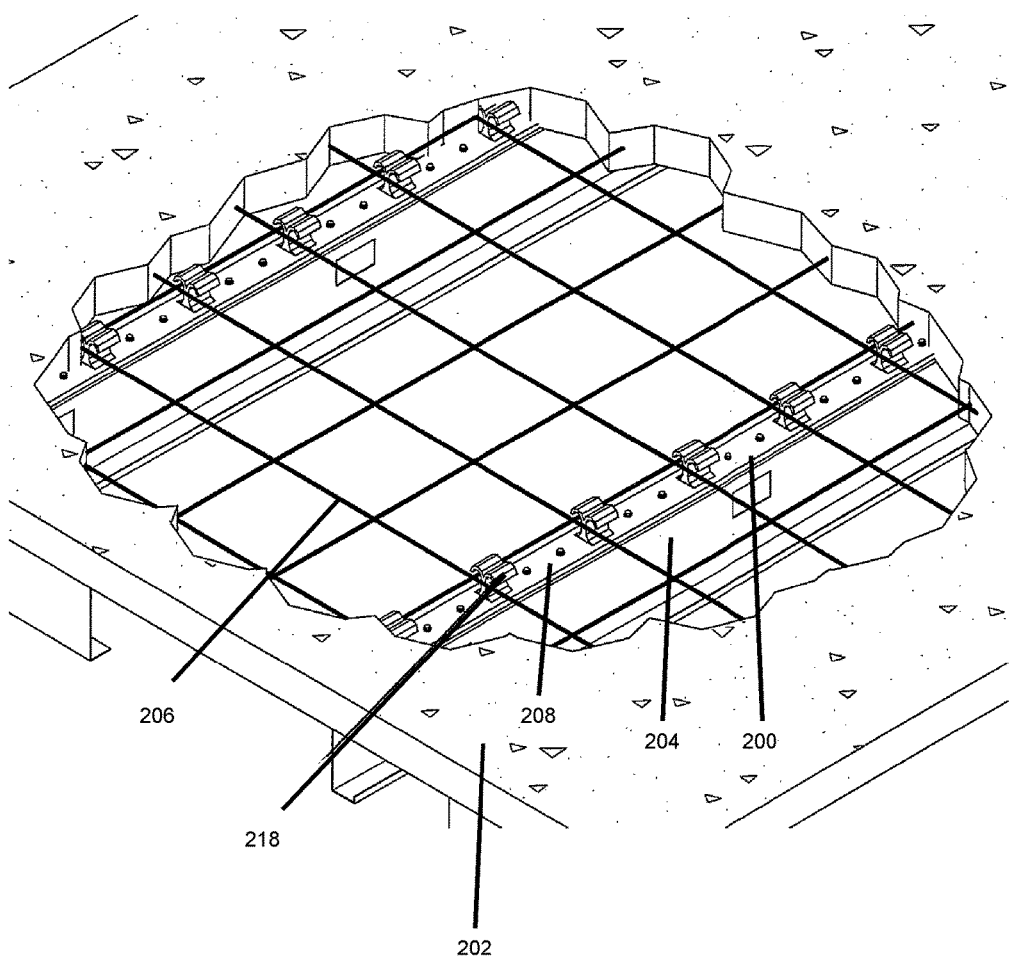
FIG. 4 is a partial sectional view of an embodiment of a double-hook shear connector embedded in a building panel and attached to a structural member.
Figure 5:
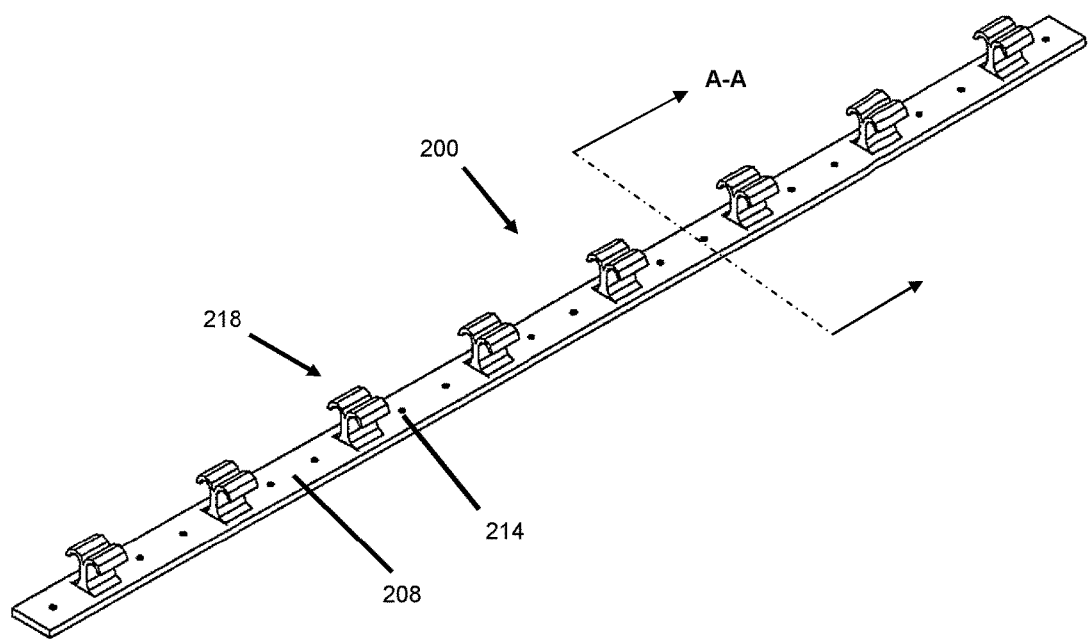
FIG. 5 is a perspective view of the shear connector of FIG. 4.
Figure 6:
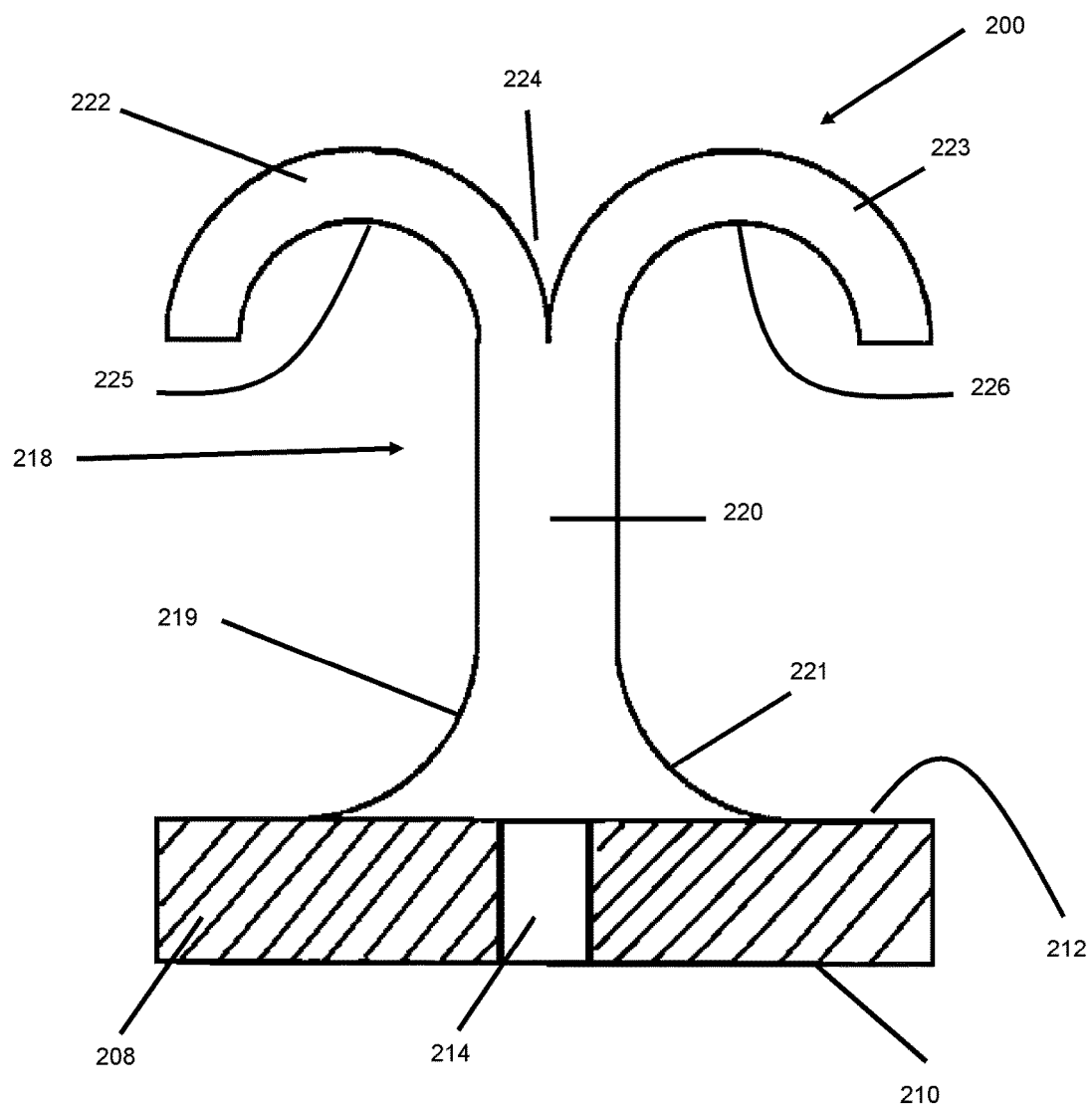
FIG. 6 is a sectional view of the shear connector of FIG. 4 taken along line A-A.

FIGS. 4-6 are illustrations of an embodiment of a shear connector 200 that is configured to serve as an insulating attachment mechanism between a building panel 202 and a structural member 204. As with the above-mentioned shear connector 100, this second embodiment of the shear connector 200 is configured to transfer structural loads and limit heat flow between the building panel 202 and the structural member 204. The shear connector 200 can be configured to chair up a reinforcing mesh 206 when embedded in the building panel 202. Furthermore, the general construction and operating principles of shear connector 200 are similar to that of the shear connector 100. Like the shear connector 100, the shear connector 200 can be manufactured using fiber reinforced polymer composite materials that provide structural integrity and advantageous thermal resistance characteristics. As such, reference should be made to the general construction of shear connector 100 except as otherwise distinguished below.

FIG. 4 is a view of the shear connector 200 embedded into a building panel 202 at a first end and attached to a structural member 204 at a second end of the device. At the first end of the device, the shear connector 200 has a generally planar rectangular base 208 with an outside surface 210 and an inside surface 212 that is attached to the structural member 204. In the illustrated embodiment, the base 208 of the shear connector 200 has a width of about one and five-eighths of an inch (1⅝") and a length of about four feet (4'). In some embodiments, the width of the shear connector can vary between, for example, about one quarter inch (0.25") and about 3 inches (3"). In some embodiments, the width can be about 2 inches (2"). The width of the shear connector 200 can vary greatly. The length of the shear connector 200 can vary greatly depending on the parameters of the building or other application for which the shear connector 200 is used. In some embodiments, the inside surface 212 (see, e.g., FIG. 6) is in contact with the building panel 202. In some embodiments, the inside surface 212 is spaced from the building panel 202 with insulating material placed therebetween.

The outside surface 210 can be configured to be placed adjacent to and in contact with the structural member 204. The base 208 has multiple apertures 214 throughout the length of the base 108 configured to allow a fastener, such as a structural screw, to pass therethrough. Like the above-mentioned shear connector 100, the number and size of the apertures 214 as well as the spacing can be dictated by the desired performance characteristics. In some embodiments, the apertures 214 are substantially equally spaced at intervals of about two inches (2"), about four inches (4"), or about six inches (6"). In the illustrated embodiment, the apertures 214 are spaced at intervals of about two inches (2") between adjacent apertures 214 and about four inches (4") between apertures separated by the hooked arms 218. Furthermore, in the illustrated embodiment, the apertures 214 have a diameter of about three-sixteenths of an inch (3/16"), and are generally centered between the two edges of the base 208.

In some embodiments, the thickness of the base 208 can range from about one-sixteenth of an inch (1/16") to upwards of an inch (1") or more. In the illustrated embodiment, the thickness of the base is about three-tenths of an inch (3/10"). However, in embodiments, where the base 208 is spaced from the building panel 202, the thickness can advantageously be reduced. In other embodiments, the thickness can be increased to further increase the U-value of the system.

With continued reference to FIG. 6, at a second end of the device, the shear connector 200 has multiple hooked arms 218 configured to be embedded within the building material 202. The hooked arms 218 can have an extension portion 220 that, at a first end, extend from the inside surface 212 of the base 208 in a direction generally perpendicular to the inside surface 212. The extension portion 220 can be centered between both edges. In the illustrated embodiment, the base 208 and the hooked arms 218 form a single, integral unit. Two fillets 219, 221 can be placed along the inside surface 212 to reduce localized stresses and to reduce the possibility of failure at these points of the shear connector 200. At a second end, the hooked arms 218 can have two hooked members 222, 223 extending generally horizontally in opposite directions. In some embodiments, the void 224 between the two members 222, 223 can be filled in to reduce the localized stresses in that area, particularly the intersection of both members 222, 223 when forces are applied. In some embodiments, the length of the hooked arm 218, defined as the distance between the inside surface 212 and the uppermost portion of the inside surface 225 of the hooked members 222, 223, can range from about one inch (1") to about two inches (2"). In the illustrated embodiment, the length of the hooked arm is about one and a quarter inches (1¼"). Many variations are possible. Furthermore, in the illustrated embodiment, the spacing of the multiple hooked arms 218 is about six inches (6") so that no hooked arm 218 interferes with the reinforcing mesh 206.

The dual member 222, 223 design of the hooked arms 218 advantageously increases the "pull-out strength" of the shear connector 200. Due to the inclusion of two members 222, 223 extending in opposite directions, the hooked members 222 and 223 each brace the shear connector 200 and increase the "pull-out strength" by increasing the interface along both the first member 222 and the second member 223. Additionally, because the hooked arms 118 are centered between both edges of the base 228 and because both hooked members 222, 223 exert similar counter-forces in the presence of a "pull-out" force, a moment force about the connection between the base 208 and hooked arms 218 is advantageously reduced thereby further reducing the potential for failure at this point of the shear connector 200.

As with the above-described shear connector 100, the shear connector 200 can be configured to chair up a reinforcing mesh 206 at least along one side of hooked members 222, 223 as shown in FIG. 4 to further increase the "pull-out strength" of the shear connector 200. The hooked members 222, 223 can have a generally semi-circular cross sectional area. In some embodiments, the radius of the hooked member can range from about one-eighths of an inch (1/8") to an inch (1"). In more some embodiments, the radius of the hooked member can range from about one-sixths of an inch (1/6") to about three-quarters of an inch (3/4"). In some embodiments, the radius of the hooked member can range from about one-quarter of an inch (1/4") to about one-half of an inch (1/2"). In the illustrated embodiment, the radius of the hooked member is about one-quarter of an inch (1/4"). Many variations in the radius of the hooked members 222, 223 are possible.

Double Hook Shear Connector with Hollow Base

Figure 12:
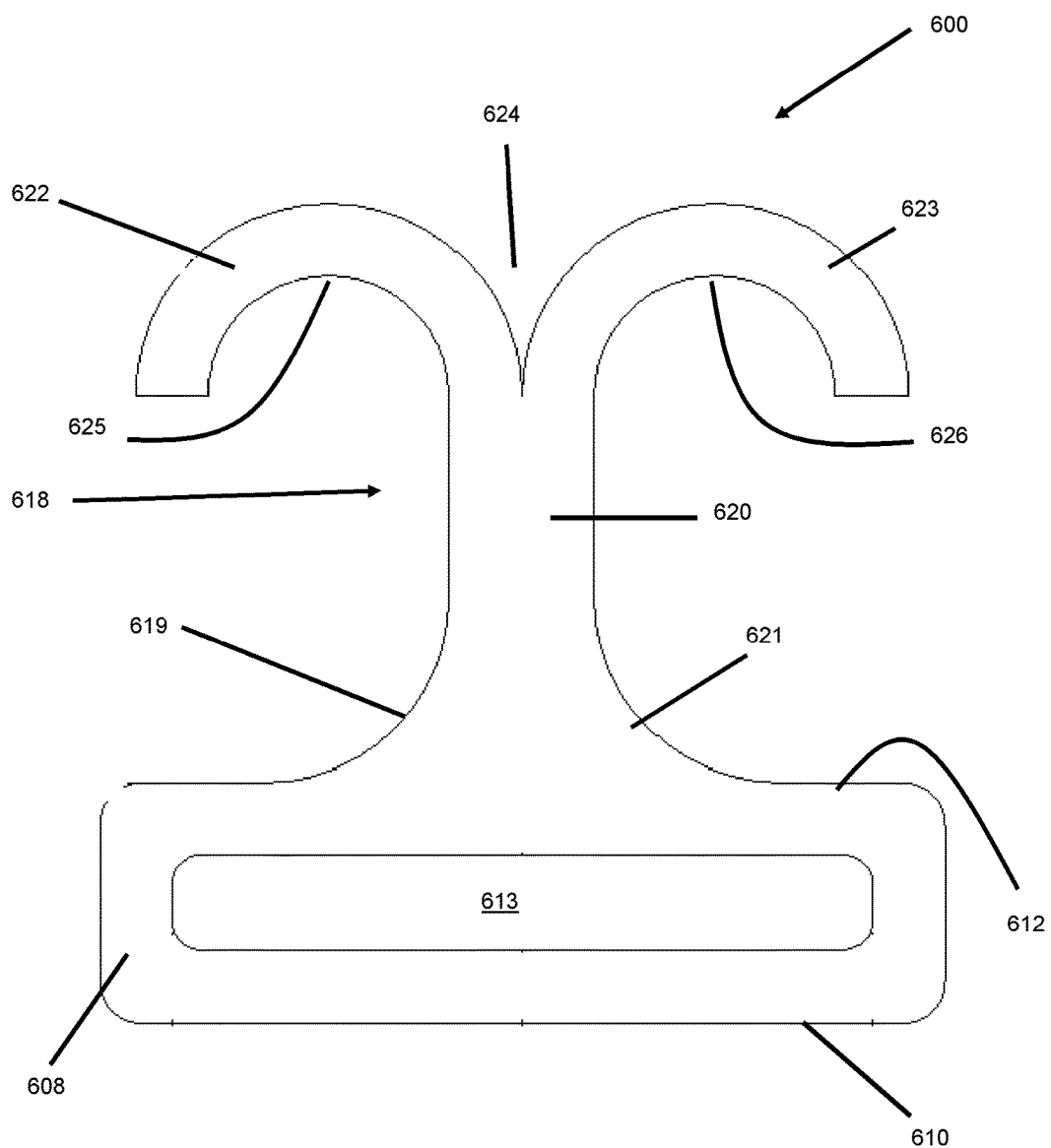
FIG. 12 is a side sectional view of an embodiment of a double-hook shear connector having a hollow channel.

FIG. 12 is an illustration of an embodiment of a shear connector 600 that is configured to serve as an insulating attachment mechanism between a building panel and a structural member. As with the above-mentioned shear connectors, such as the shear connector 200, the shear connector 600 is configured to transfer structural loads and limit heat flow between the building panel and the structural member. The shear connector 600 can be configured to chair up a reinforcing mesh when embedded in the building panel. Furthermore, the general construction and operating principles of the shear connector 600 can be similar to that of the shear connector 200. Like the shear connector 200, the shear connector 600 can be manufactured using fiber reinforced polymer composite materials that provide structural integrity and advantageous thermal resistance characteristics. Furthermore, like shear connector 200, shear connector 600 maintains the benefits and advantages of a dual hooked member design.

FIG. 12 is a front sectional view of the shear connector 600, which can be embedded into a building panel at a first end and attached to a structural member at a second end of the device. At the first end of the device, the shear connector 600 has a generally planar rectangular base 608 with an outside surface 610 and an inside surface 612 that is attached to the structural member. In the illustrated embodiment, the base 608 of the shear connector 600 has a width of about one and five-eighths of an inch (1⅝") and a length of about four feet (4'), though both the width and length of the shear connector 600 can vary widely depending on the application for which the shear connector 600 is used. In some embodiments, the inside surface 612 is in contact with the building panel. In some embodiments, the inside surface 612 is spaced from the building panel with insulating material placed therebetween. In some embodiments, the thickness of the base 608 can range from about one-sixteenth of an inch (1/16") to upwards of an inch (1") or more. In the illustrated embodiment, the thickness of the base is about one-half of an inch (1/2"). In embodiments where the base 608 is spaced from the building panel, the thickness can be reduced. In other embodiments, the thickness can be increased to further increase the U-value of the system.

The base 608 also has a channel 613 running throughout the length of the base 608. This channel 613 may provide thermal insulation by providing a layer of insulating material or fluid, such as air, between the outside surface 610 and the inside surface 612. In other embodiments, the channel 613 may be filled with other material with thermal insulation characteristics more advantageous than materials used for the base 608. In some embodiments, the channel 613 has a width of about 1.450 inches and a thickness of about 0.200 inches. In some embodiments, the width may be increased and the thickness may be increased to potentially provide more advantageous thermal characteristics. In some embodiments, the width and/or thickness may be decreased to provide more structural rigidity for the base 608. Plugs may be used at both ends of the channel 613 to reduce or eliminate the likelihood that concrete ingresses into the channel while concrete is being poured.

As with the shear connector 200, the outside surface 610 can be configured to be placed adjacent to and in contact with the structural member. The base 608 may have multiple apertures throughout the length of the base 608 configured to allow a fastener, such as a structural screw, to pass therethrough. As discussed above with respect to the other embodiments of the shear connectors, the number, spacing, and size of the apertures can be dictated based on the required performance characteristics.

With continued reference to FIG. 12, at a second end of the device, the shear connector 600 has multiple hooked arms 618 configured to be embedded within the building material. The design of the hooked arms 618 are similar to that of the hooked arms 218 of the shear connector 200. As such, the hooked arms can have an extension portion 620 extending from an inside surface 612 of the base 608, fillets 619 and 621 to reduce localized stresses along those areas, and hooked members 622 and 623 with a void 624 therebetween. In some embodiments, the void 624 can be filled in to reduce localized stresses in the area. In some embodiments, the length of the hooked arm 618, defined as the distance between the inside surface 612 and the uppermost portion of the inside surface 625 of the hooked members 622 and 623 can range from about one inch (1") to about two inches (2"). Many variations are possible. In the illustrated embodiment, the length of the hooked arm is about one and a half inches (1.5").

The hollow base 608 of the shear connector 600 may be implanted with any other integrally formed shear connector such as the shear connector 100, for example but without limitation.

Sleeve and Strip Shear Connector

Figure 7:
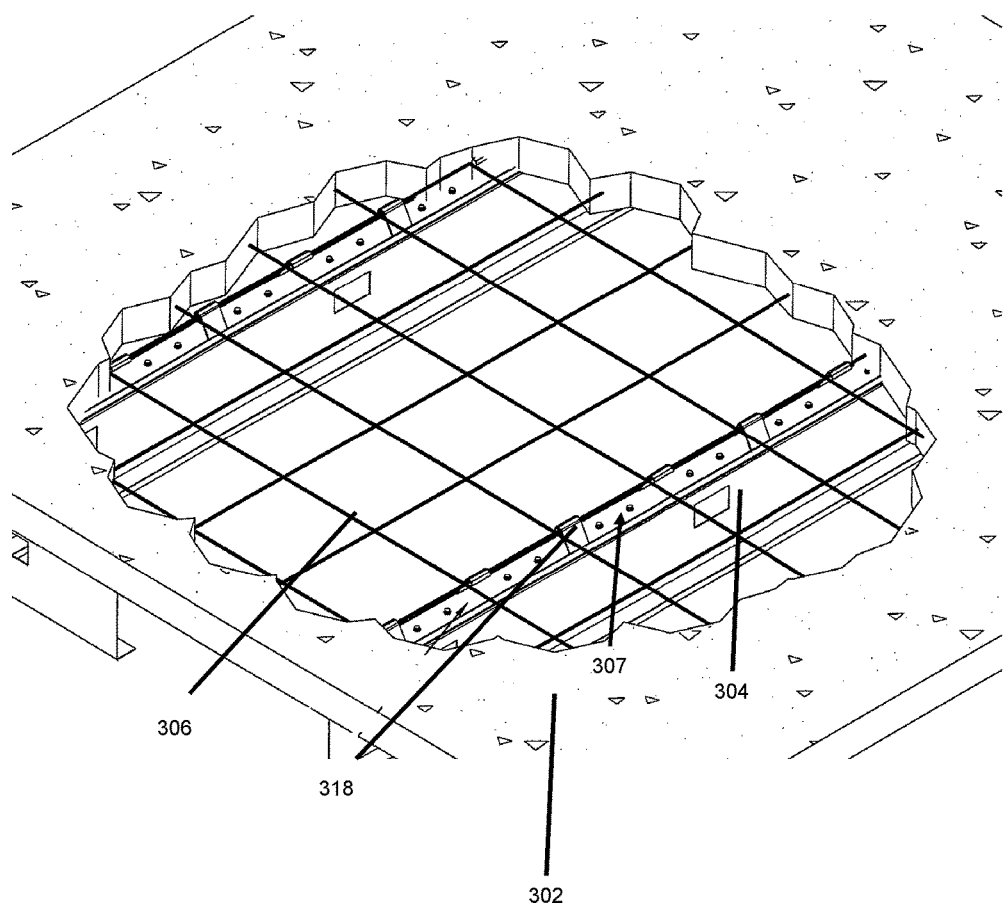
FIG. 7 is a partial sectional view of an embodiment of a sleeve and strip shear connector embedded in a building panel and attached to a structural member.
Figure 8:
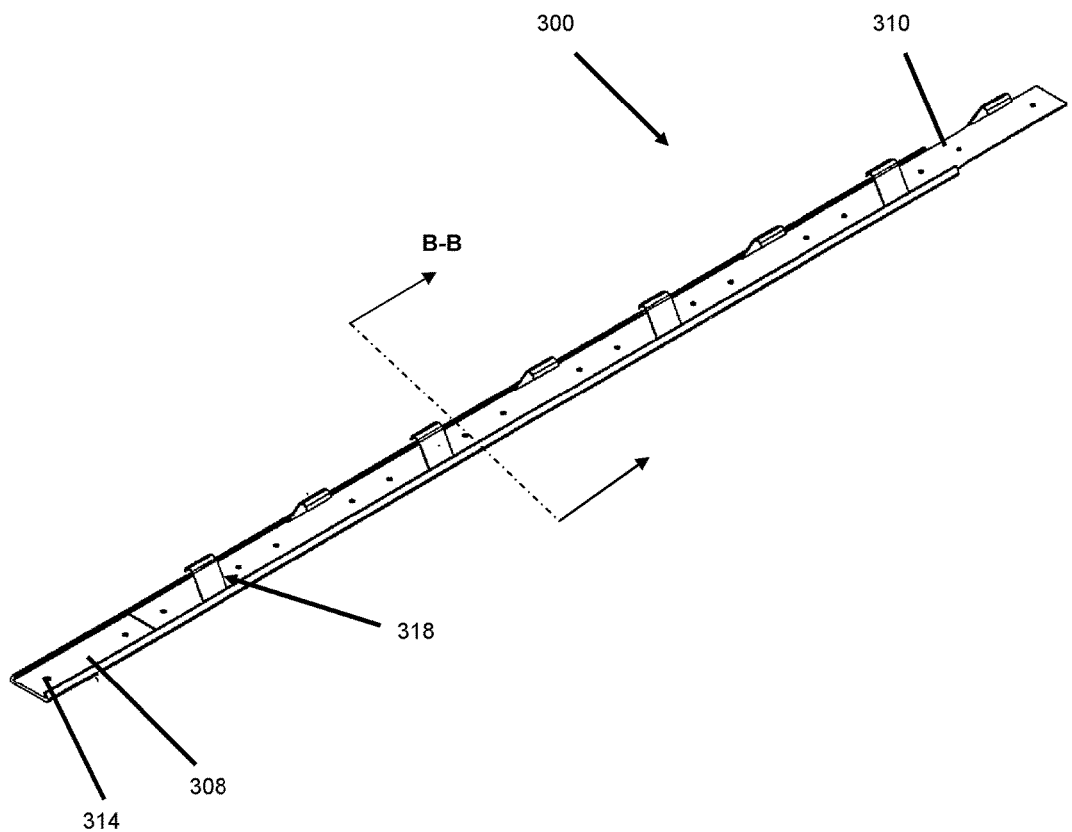
FIG. 8 is a perspective view of the shear connector of FIG. 7 in a partially engaged state.
Figure 9:
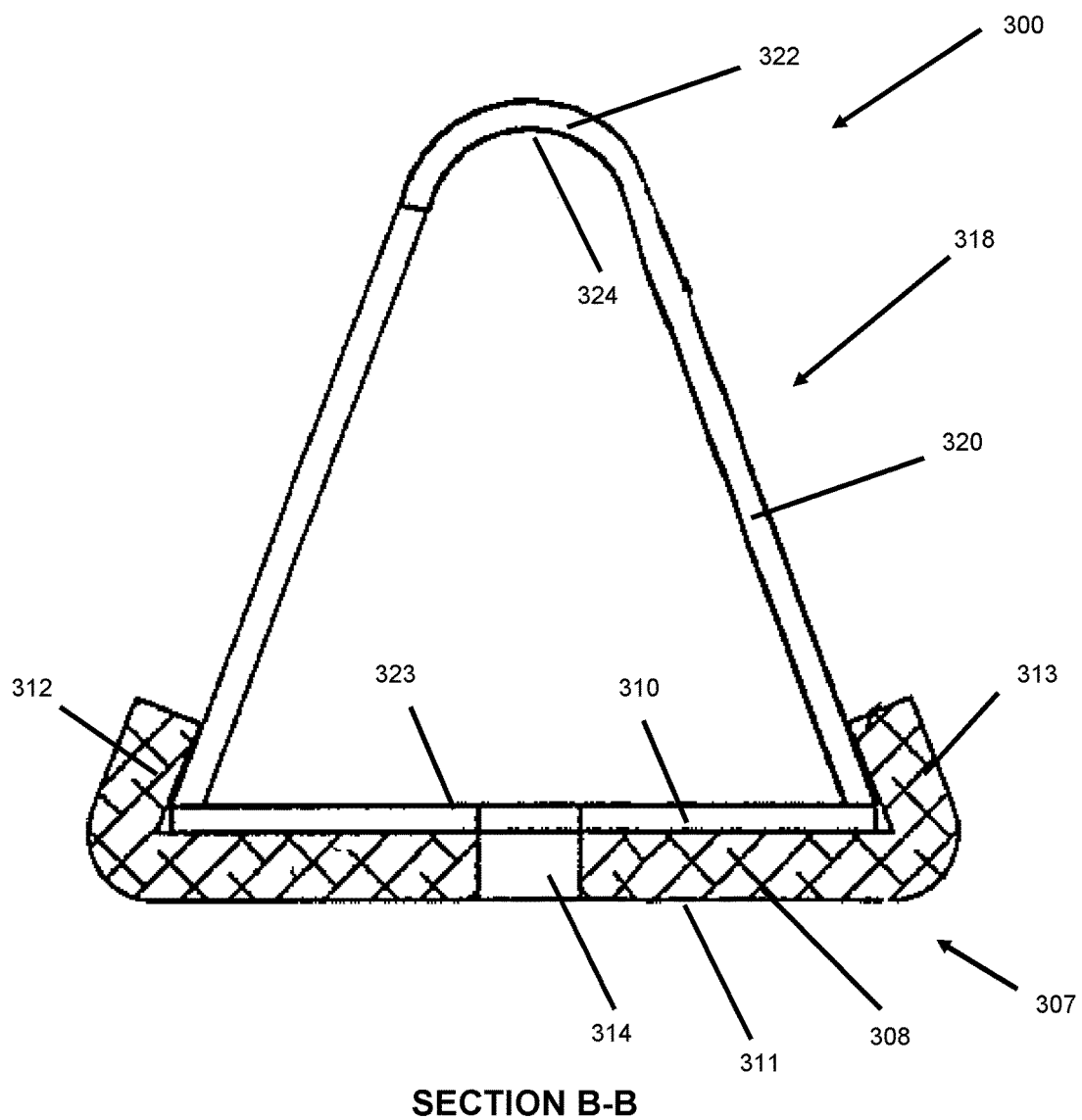
FIG. 9 is a sectional view of the shear connector of FIG. 7 along line B-B.

FIGS. 7-9 are illustrations of an embodiment of a shear connector 300 that is configured to serve as an insulated attachment mechanism between a building panel 302 and a structural member 304. As with the above-mentioned shear connectors 100, 200, 600, this fourth embodiment of the shear connector 300 can be configured to transfer structural loads and limit heat flow between the structural member 304 and the building panel 302. Furthermore, the general operating principles of the shear connector 300 are similar to that of the shear connectors 100, 200, 600. The shear connector 300 can be configured to chair up a reinforcing mesh 306 when embedded in the building panel 302. As such, reference should be made to the general construction of the shear connectors 100, 200, 600 except as otherwise distinguished below.

The shear connector 300 can be formed of two separate components—a sleeve 308 and a strip 310—which, after manufacture, are combined into the shear connector 300. The sleeve 308 can be manufactured from a variety of materials such as, but not limited to, fiber reinforced polymer composite materials. In the illustrated embodiment, the sleeve 308 is manufactured from a composite, such as glass fiber reinforcement in a vinyl ester resin matrix. The strip 310 can also be manufactured from a variety of materials such as, but not limited to, metals including stainless steel and titanium. In the illustrated embodiment, the strip 310 is manufactured from 18 gauge steel. Separating the shear connector 300 into two components can significantly reduce the costs of manufacture by allowing, for example, the sleeve 308 to be pultruded with little post-manufacturing processing, such as milling, whereas the strip 310 can be molded if the material lends itself better to such manufacturing processes.

FIG. 9 is a front section view of the shear connector 300, which is shown with the sleeve 308 and the strip 310 combined. At a first end of the device, the shear connector 300 has the sleeve 308, which can have a planar outside surface 311 configured to be placed adjacent to and in contact with the structural member 304. As with the other shear connectors 100, 200, 600 described above, the sleeve 308 has a width that generally corresponds to the width of the structural member 304 attached thereto. In the illustrated embodiment, the sleeve 308 has a width of about one and five-eighths of an inch (1⅝") and a length of about four feet (4'), though many variations of the length and width of the sleeve 308 are possible for varying applications. The sleeve 308 also has two retaining members 312, 313 that protrude inwardly at an angle from the planar member of the sleeve 308. The retaining members 312, 313 are configured to retain the strip 310 after the strip 310 has been slid into the sleeve 308.

In some embodiments, the shear connector 300 is directly attached to the structural member 304. In some embodiments, the sleeve 308 and the strip 310 have 314 apertures that are configured to allow a fastener, such as a structural screw or other suitable fastener, to pass through both the sleeve 308 and the strip 310 for attaching the structural member 304 to the shear connector 300. In some embodiments, the apertures 314 are generally equally spaced at intervals of about two inches (2"), about four inches (4"), or about six inches (6"). In the illustrated embodiment, pairs of apertures 314 spaced apart by about two inches (2") relative to each other and each pair can be separated from an adjacent pair by about four inches (4"). The apertures 314 can be placed substantially equidistant from both edges of the strip 310. Furthermore, in some embodiments, the thickness of the sleeve 308, defined as the distance between the outside surface 311 to an inside surface, can range from about one-sixteenth of an inch (1/16") to upwards of an inch (1") or more. In the illustrated embodiment, the thickness of the base is about one-eighth (⅛") of an inch.

With continued reference to FIG. 9, at a second end of the device, the shear connector 300 has a strip 310 that contains multiple hooked arms 318 configured to be embedded within the building material 302. The hooked arms 318 of the shear connector 300 have an extension portion 320 that, at a first end, extend inwardly from the strip 310 at an angle corresponding to the angle of the retaining members 312, 313. In the illustrated embodiment, the strip 310 and the hooked arms 318 form a single, integral unit. The multiple hooked arms 318 can be located along both edges of the strip 310 with adjacent hooked arms 318 extending along the opposite edge. Although not shown in the illustrated embodiment, a fillet can be placed along the interior corner at the intersection between the hooked member 318 and the strip 310 to reduce localized stresses and to reduce the possibility of failure at this point of the shear connector 300. The hooked arms 318 have a hooked member 322.

In some embodiments, the length of the hooked arm 318, defined as the distance between the top surface 323 of the strip and the uppermost portion of the inside surface 324 of the hooked member 322, can range from about one inch (1") to about two inches (2"). In the illustrated embodiment, the length of the hooked arm is about one and a quarter inches (1¼"). Furthermore, in the illustrated embodiment, the spacing of the multiple hooked arms 318 is about six inches (6") so that no hooked member interferes with the reinforcing mesh 306. Furthermore, in the illustrated embodiment, the hooked arms 318 are angled such that centers of the hooked members 322 are centered between both edges of the strip 310. Additionally, the hooked member 322 generally has a U-shaped cross-sectional area for chairing up a reinforcing mesh 306 when the device is embedded in a building panel 302. In the illustrated configuration, the hooked arms 318 alternate direction down the length of the shear connector 300. In some configurations, the hooked arms 318 may all face the same direction or have any suitable configuration of alternating directions.

Spacer and Strip Shear Connector

Figure 13:
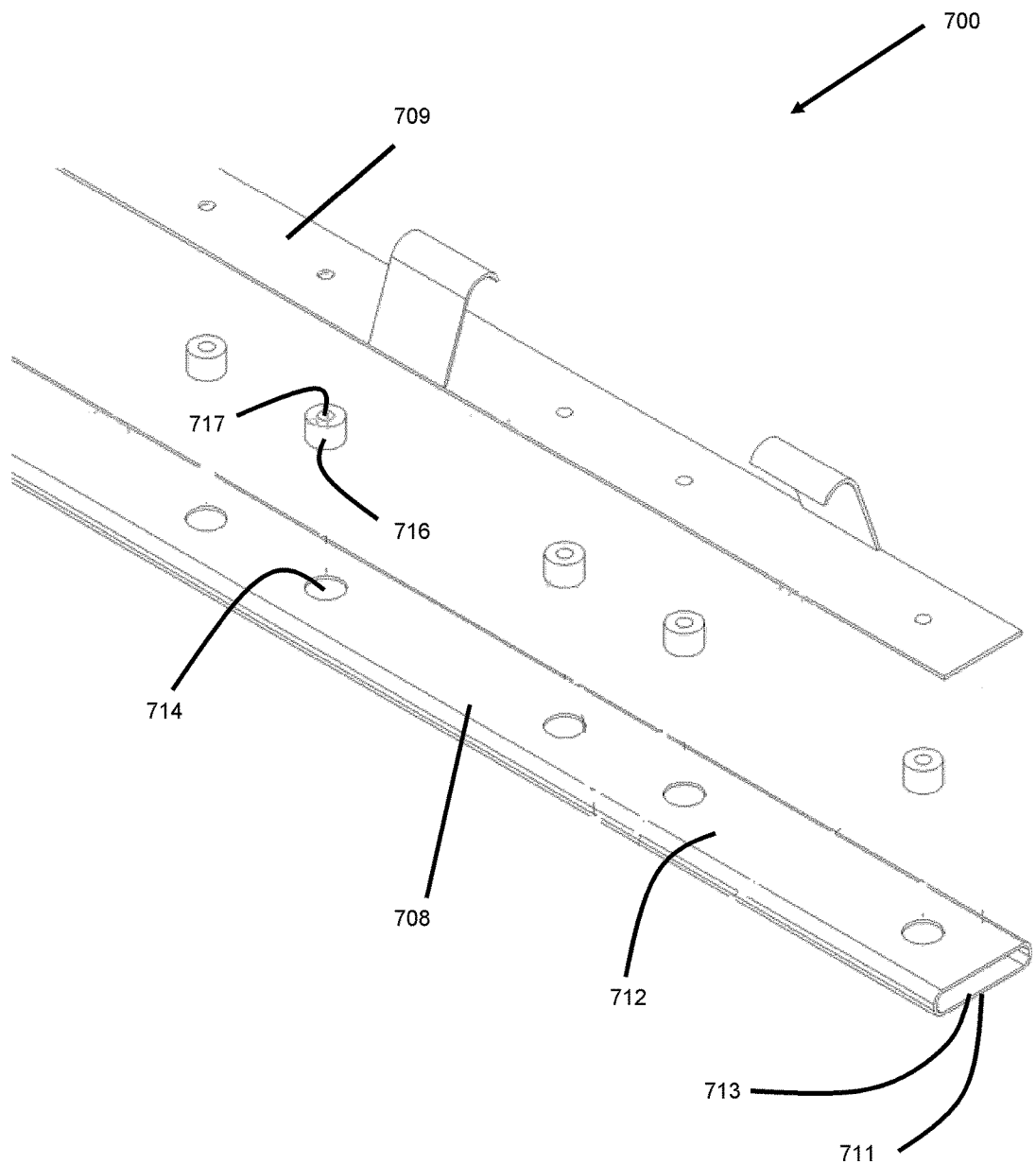
FIG. 13 is an exploded view of an embodiment of a spacer and strip shear connector.
Figure 14:
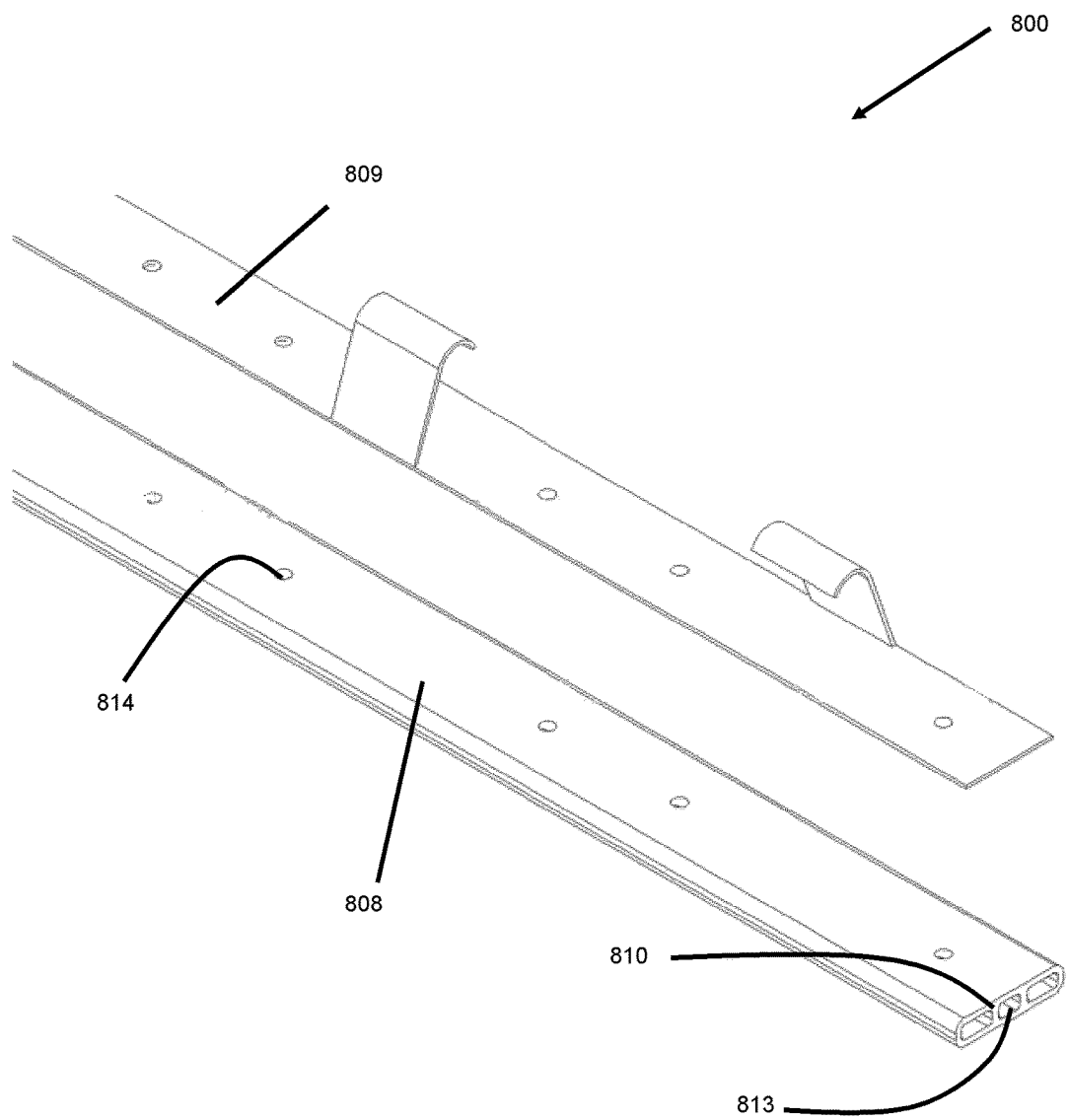
FIG. 14 is an exploded view of an embodiment of a spacer and strip shear connector.
Figure 15:
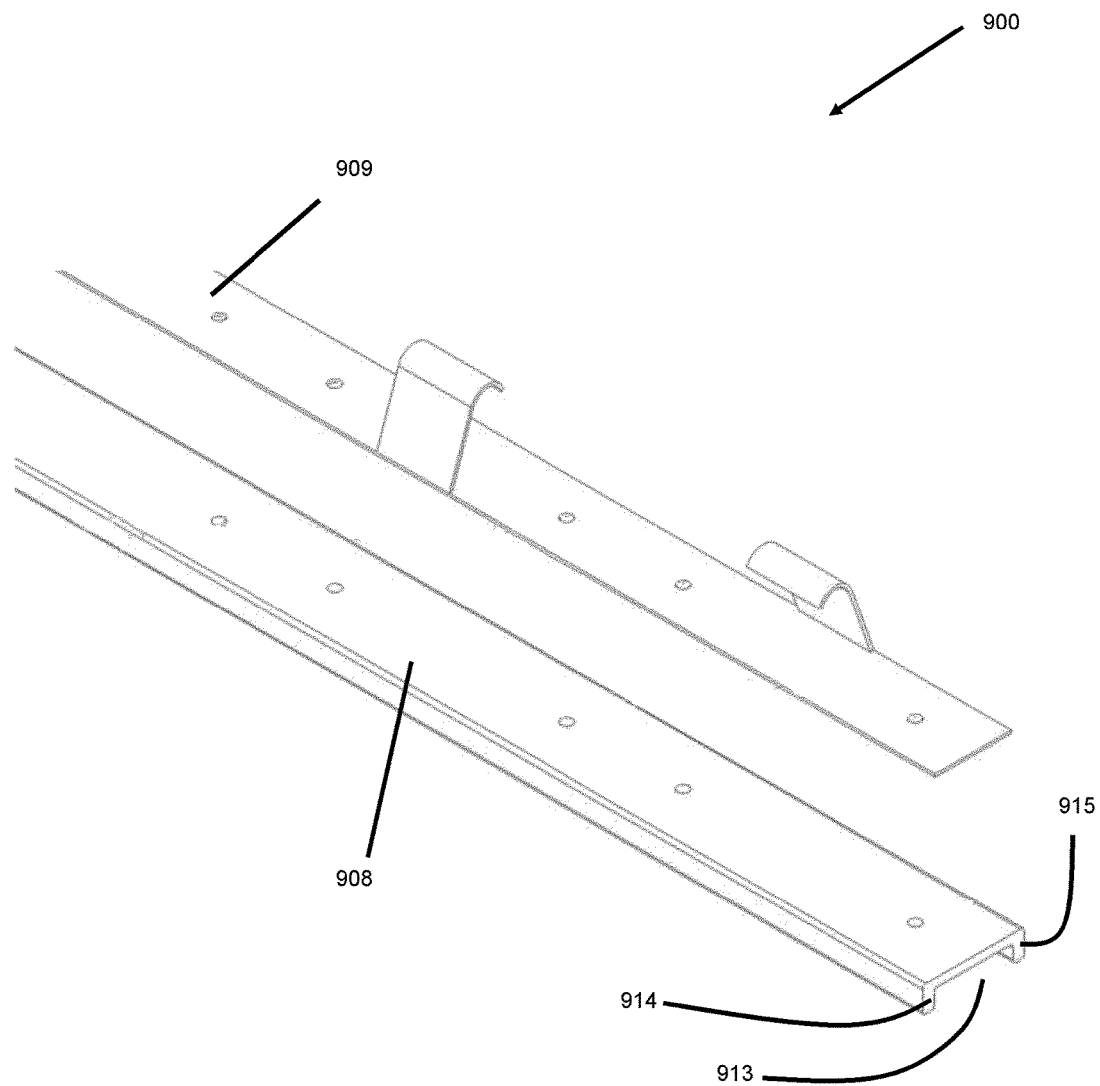
FIG. 15 is an exploded view of an embodiment of a spacer and strip shear connector.

FIGS. 13-15 are illustrations of embodiments of two-piece shear connectors configured to serve as an insulating attachment mechanism between a building panel and a structural member. As with the above-mentioned connectors, these embodiments of connectors are configured to transfer structural loads and limit heat flow between the building panel and the structural member. Furthermore, the general operating principles of the shear connectors described below are similar to those of the shear connectors described above. These embodiments of shear connectors are configured to chair up a reinforcing mesh when embedded in the building panel. As such, reference should be made to the general construction of shear connectors described above except as otherwise distinguished below.

FIG. 13 is an illustration of an embodiment of a shear connector 700 formed of two separate components—a spacer 708 and a strip 709—which are combined after manufacture into shear connector 700. The strip 709 can be identical to the strip 309 of the shear connector 300. Therefore, the strip 709 shares structural features, operational requirements, and advantages of the strip 309. As such, reference should be made to the description of the strip 309 for purposes of understanding the components and use of the strip 709.

The spacer 708 can be manufactured from a variety of materials such as, but not limited to, fiber reinforced polymer composites such as glass fiber reinforcement in a vinyl ester resin matrix. The spacer 708 has a planar outside surface 711 configured to be placed adjacent to and in contact with a structural member. As with the other shear connectors described above, the spacer 708 has a width that generally corresponds to the width of the structural member attached thereto. In the illustrated embodiment, the spacer 708 has a width of about one and five-eighths of an inch (1⅝") and a length of about four feet (4'), though many variations of the width and length of the spacer 708 are possible depending on the application of the spacer 708. The spacer 708, like the shear connector 600, has a channel 713 running throughout the length of the spacer 708. This channel may provide thermal insulation by providing a layer of insulating material or fluid, such as air, between the outside surface 711 and the inside surface 712. In other embodiments, the channel 713 may be filled with other material with thermal insulation characteristics more advantageous than materials used for the base 708. In some embodiments, the channel 713 has a width of about 1.450 inches and a thickness of about 0.200 inches, though many variations of the width and length of the channel 713 are possible depending on the application of the channel 713. In some embodiments, the width may be increased and the thickness may be increased to potentially provide more advantageous thermal characteristics. In some embodiments, the width and/or thickness may be decreased to provide more structural rigidity for the base 708. Plugs may be used at one or both ends of the channel 713 to reduce or eliminate the likelihood that concrete ingresses into the channel while concrete is being poured.

The spacer 708 can have apertures 714 that are configured to allow a fastener, such as a structural screw or other suitable fastener, to pass through both the spacer 708 and the strip 709 for attaching the structural member to the shear connector 700. As discussed above with respect to the other embodiments of the shear connectors, the number, spacing, and size of apertures can be determined based on the desired performance characteristics.

The support members 716 can be inserted into the apertures 714. When used, the support members 716 can be sized such that the bottom surface of the support members 716 are in contact with an inner surface of the spacer 708 and a top surface of the support members are in contact with a bottom surface of the strip 709. Furthermore, the support members 716 may additionally include an aperture 717 running longitudinally through the support member 716 and configured to receive a fastener. As such, the support members 716 may be configured to allow the shear connector 700 to better maintain structural integrity when in the presence of compressive loads.

FIG. 14 is an illustration of an embodiment of a shear connector 800 formed of two separate components—a spacer 808 and a strip 809—which can be combined after manufacture into shear connector 800. The strip 809 can be identical to the strip 309 of the shear connector 300. Therefore, the strip 809 shares structural features, operational requirements, and advantages of the strip 309. As such, reference should be made to the description of the strip 309 for purposes of understanding the components and use of the strip 809.

The spacer 808 can be similar to the spacer 708 of the shear connector 700. However, the spacer 808 contains internal webs or struts 810 running throughout portions of or the entire length of the channel 813. The webs or struts 810 provide additional structural integrity for the spacer 808 to reduce the likelihood of buckling and collapse. The webs or struts 810 can be placed on both sides of the apertures 814. In some embodiments, the channel 913 may be separated into three separate channels by the webs or struts 810. The plugs may be used at one or both ends of the channel 813 to reduce or eliminate the likelihood that concrete ingresses into the channel while concrete is being poured.

FIG. 15 is an illustration of an embodiment of a shear connector 900 formed of two separate components—a spacer 908 and a strip 909—which are combined after manufacture into the shear connector 900. The strip 909 can be identical to the strip 309 of the shear connector 300. Therefore, the strip 909 shares structural features, operational requirements, and advantages of the strip 309. As such, reference should be made to the description of strip 309 for purposes of understanding the components and use of strip 909.

The spacer 908 is similar to the spacer 708 of the shear connector 700. However, the spacer 908 has a partially-enclosed channel 913. In the illustrated embodiment, the channel 913 has a "C-shaped" cross-section with outer panels 914, 915 configured to contact and abut a structural member. The reduced interface area between the spacer 908 and the structural member advantageously provides reduced thermal transfer between the spacer 908 and the structural member.

Figure 16:
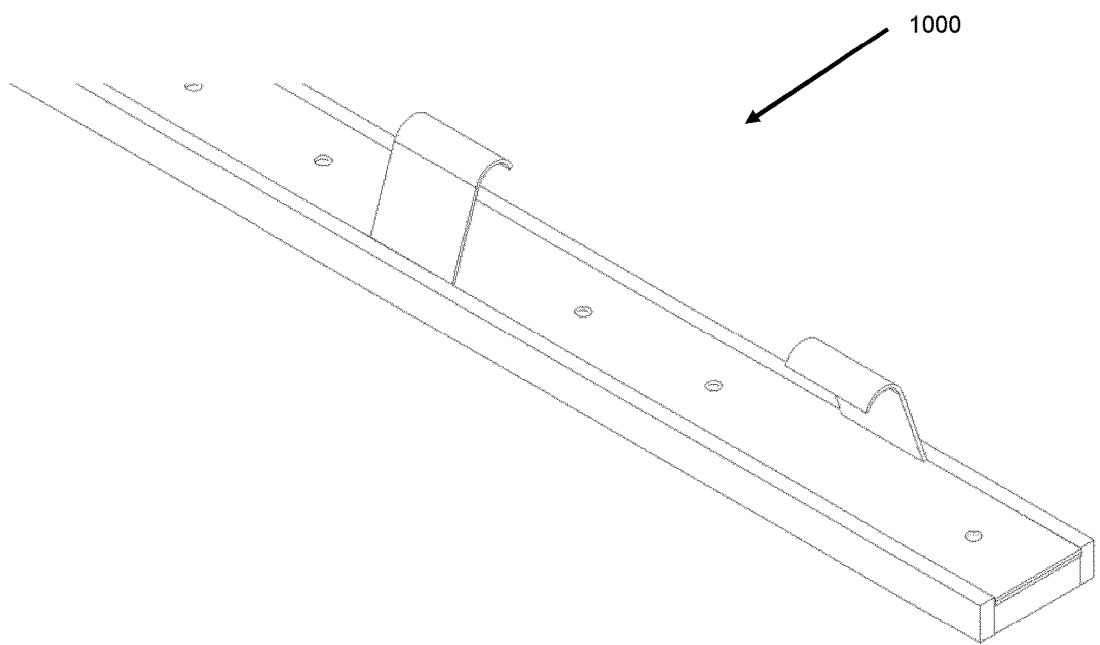
FIG. 16 is a perspective view of an embodiment of a spacer and strip shear connector.
Figure 17:
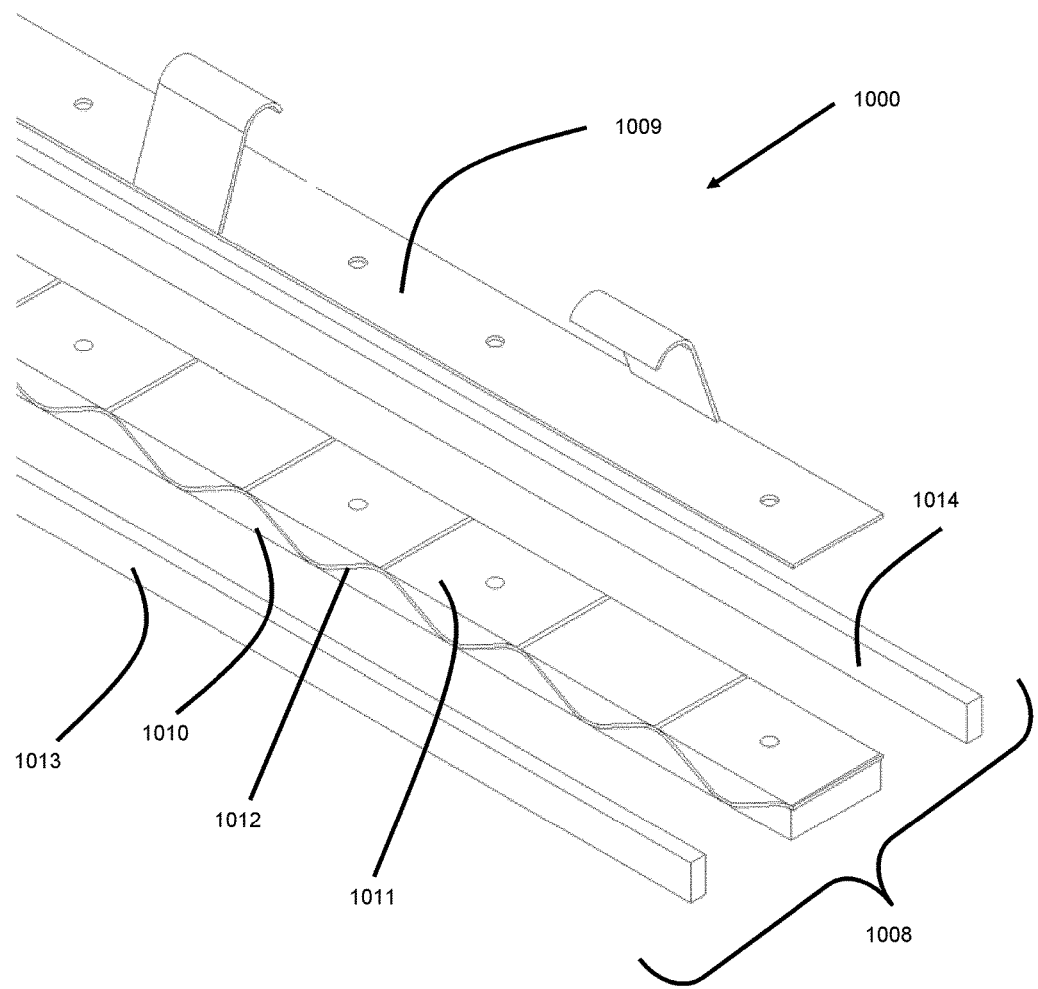
FIG. 17 is an exploded view of the spacer and strip shear connector of FIG. 16.
Figure 18:
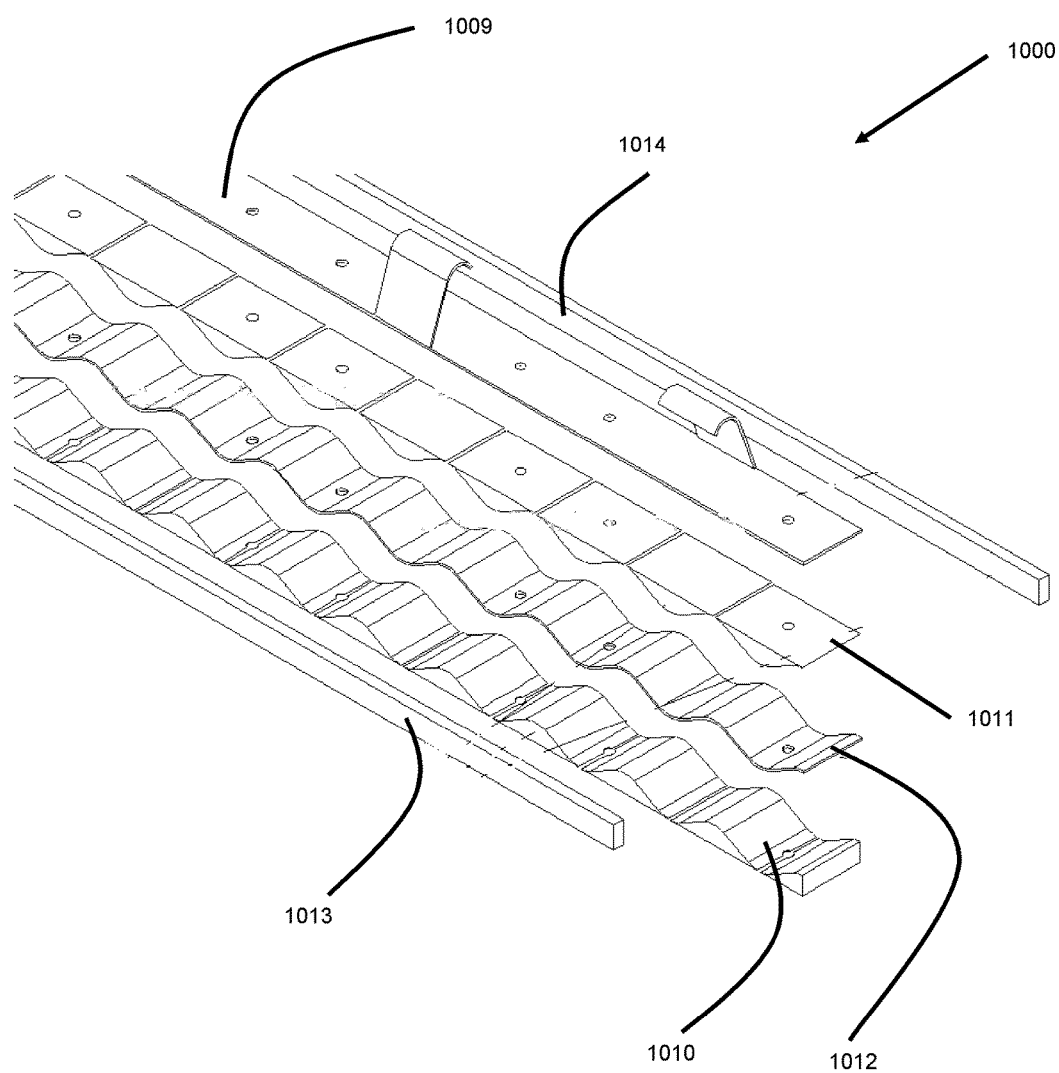
FIG. 18 is a further exploded view of the spacer and strip shear connector of FIG. 16.

FIGS. 16-18 are illustrations of an embodiment of a shear connector 1000 formed of two base components—a spacer 1008 and a strip 1009—that are combined after manufacture into the shear connector 1000 (as shown in FIG. 16). The strip 1009 can be identical to the strip 309 of the shear connector 300. Therefore, the strip 1009 shares structural features, operational requirements, and advantages of the strip 309. As such, reference should be made to the description of strip 309 for purposes of understanding the components and use of the strip 1009.

As illustrated more clearly in FIG. 17, the spacer 1008 is formed of multiple components, such as an outside insulation member 1010, an inside insulation member 1011, a reinforcement member 1012, and side insulation panels 1013, 1014. The outside insulation member 1010 is configured to be placed adjacent to and in contact with a structural member. The inside insulation member 1011 is configured to be placed adjacent to and in contact with the strip 1009. Placed between both the outside insulation member 1010 and the inside insulation member 1011 is a reinforcement member 1012 configured provide greater structural integrity for the spacer 1008 when fully assembled. In the illustrated embodiment, the structural member has a sinusoidal shape to minimize contact surface area with the structural member as well as to provide a means of increasing the strength-to-weight ratio in this particular application. By reducing the contact area, the heat flow can be reduced between the structural member and the building panel through the connector 1000. Other shapes may be used such as triangle waves, square waves, arched waves, and other similar shapes. The insulation members 1010 and 1011 have surfaces that correspond to the shape of the structural member 1012, such that, when assembled together, the members 1010, 1011, 1012 fit snugly. The side insulation panels may be placed along the two sides of the spacer 1008 to provide additional thermal insulation. Additionally, the side insulation panels 1013, 1014 may also be sized such that they also cover the side edges of the strip 1009 when the shear connector 1000 is fully assembled.

In the illustrated embodiment, the insulation members 1010, 1011, as well as the side insulation panels 1013, 1014, can be manufactured from insulating foam material. In some embodiments, other insulating materials may be used. The structural member 1012 and/or the strip 1009 can be manufactured from a fiber reinforced polymer composite or metals such as steel, stainless steel, or similar materials. In one method of manufacturing the spacer 1008, the structural member 1012 and the strip 1009 are placed in a rectangular mold with the structural member 1012 and the strip 1009 located in the preferred location for the shear connector 1000. An expanding foam material may then be introduced into the rectangular mold, which will expand to fill the mold and create the structure of shear connector 1000. The spacer 1008 may then enter post-processing, where apertures may be drilled and the individual pieces may be separated to facilitate transportation of shear connectors 1000.

One or more of the insulation members 1010, 1011, and the side insulation panels 1013, 1014, may be omitted from the shear connector 1000 if the building panel (e.g., concrete panel) is cast with a gap between the inside surface of the strip 1009 and the building panel. In such cases, an insulating material with a low thermal conductivity, such as a spray-on foam or a spray-on fiberglass, can be used to fill in the gap between the building panel (e.g., the building panel) and the inside surface of the rail 1009, as well as the gaps around the structural member 1012.

Base and Individual Hook Shear Connector

Figure 10:
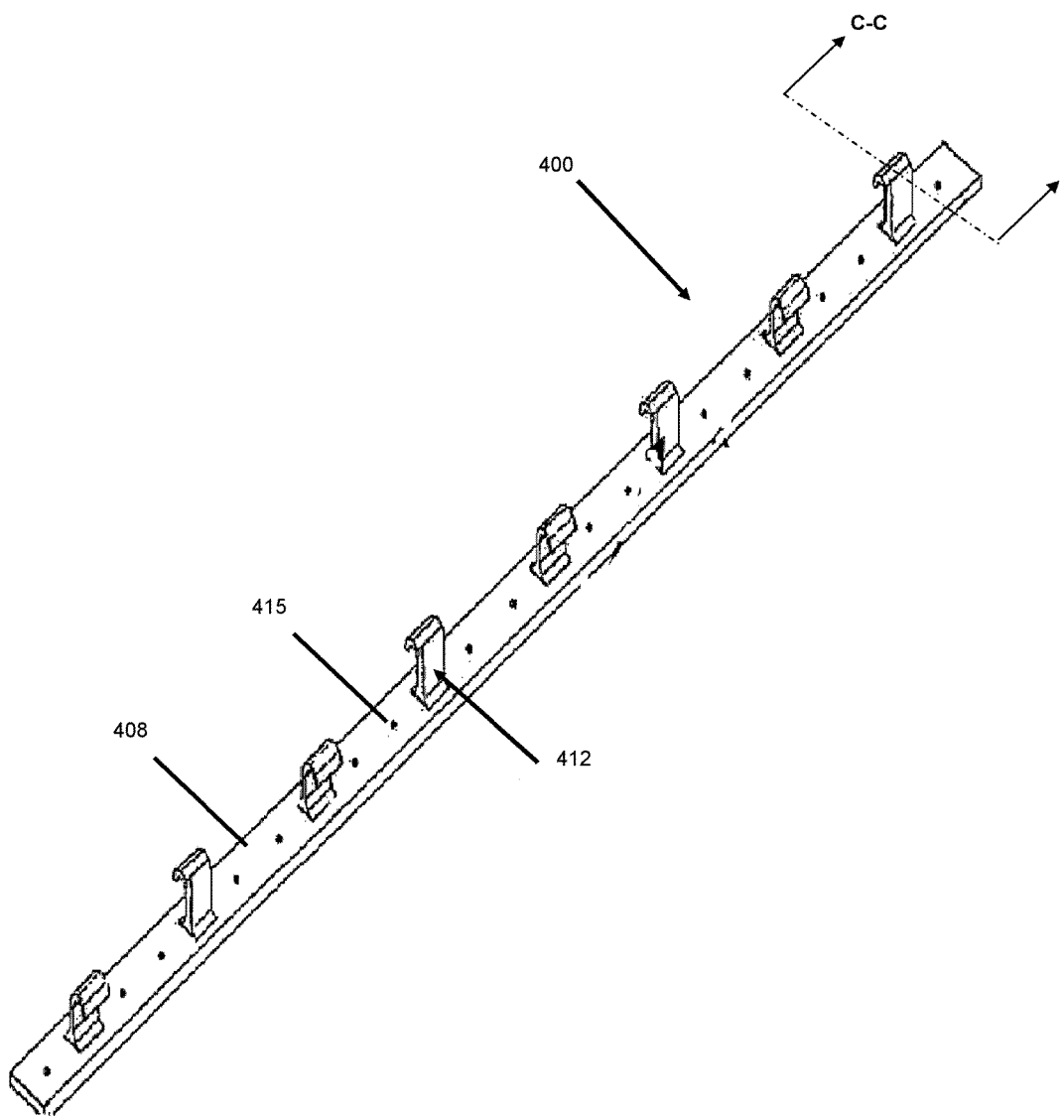
FIG. 10 is a perspective view of an embodiment of a shear connector with a base and individual hooks.
Figure 11:
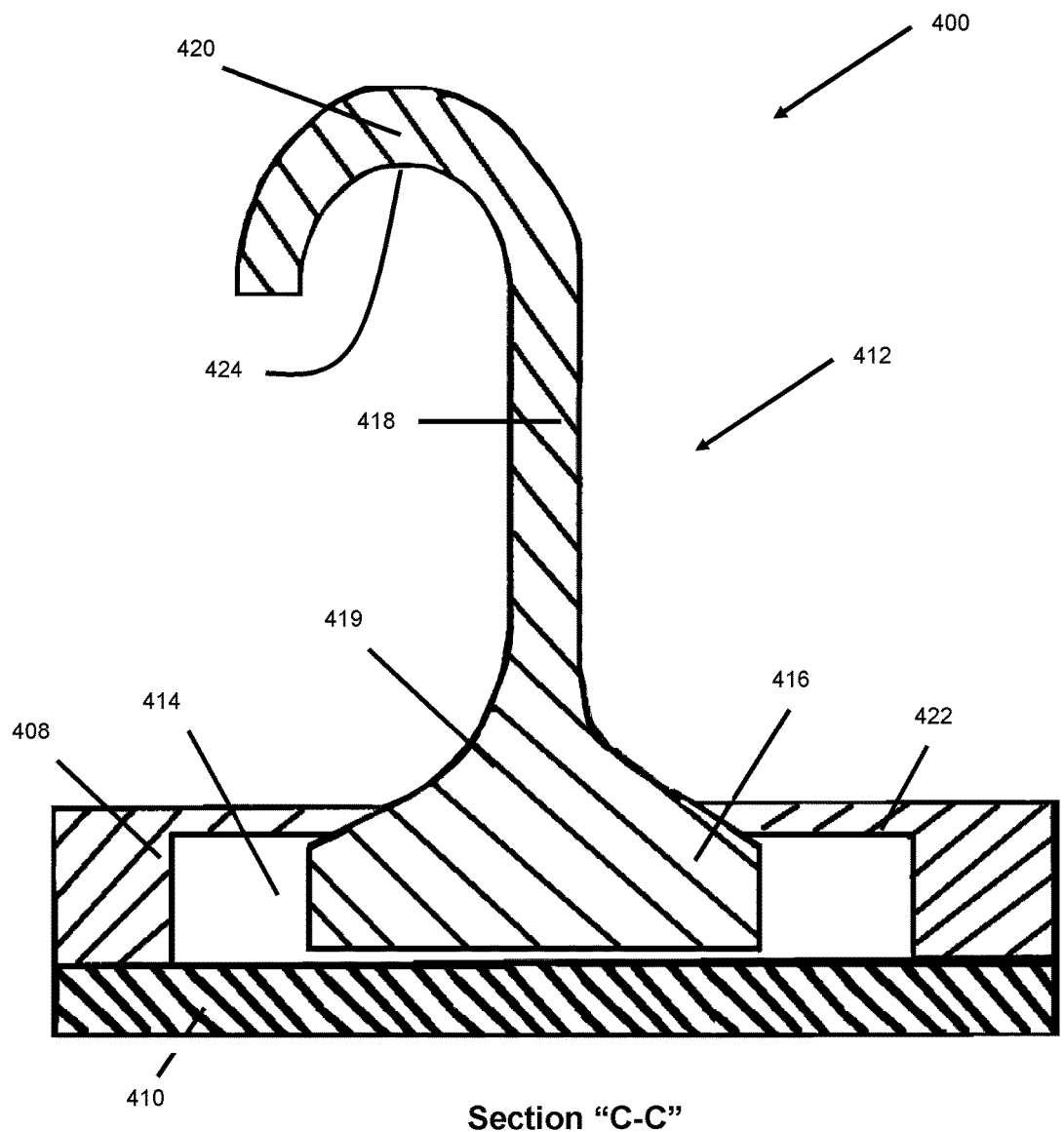
FIG. 11 is a sectional view of the shear connector of FIG. 10 along line C-C.

FIGS. 10 and 11 are illustrations of an embodiment of a shear connector 400 that is configured to serve as an insulating attachment mechanism between a building panel 402 and a structural member 404. As with the above-mentioned shear connectors 100, 200, 300, the shear connector 400 is configured to transfer structural loads and limit heat flow between the building panel 402 and the structural member 404. Furthermore, the general operating principles of the shear connector 200 are similar to that of the shear connectors 100, 200, 300. The shear connector 400 is configured to chair up a reinforcing mesh 406 when embedded in the building panel 402. As such, reference should be made to the general construction of shear connectors 100, 200, 300 except as otherwise distinguished below.

With reference to FIG. 11, which is a front section view of the shear connector 400, the shear connector 400 is formed of multiple components—a base 408, a retaining strip 410, and multiple hooked arms 412—that are combined after manufacture to form the assembled shear connector 400. The base 408 incorporates multiple apertures 414 that receive the hooked arms 412. In the illustrated embodiment, the apertures 414 are spaced at a distance of about six inches (6") although, in some embodiments, other spacing can be used depending on factors such as, but not limited to, the type of retaining mesh 406 being used and the desired pull-out strength of the shear connector 400. Furthermore, the apertures 414 can be offset from the center, such that, when inserted, the adjacent hooked arms 412 can be placed facing opposite directions (as shown in FIG. 10). In some embodiments, the hooked arms 412 face in the same direction. In order to reduce or eliminate the likelihood that the hooked arms 412 will fall out of the base 408 after insertion, the retaining strip 410 can be glued or otherwise secured to the bottom of base 408. In some embodiments, the retaining strip 410 is disposed of prior to attaching the shear connector 400 to the structural member 404. In other embodiments, the retaining strip 410 remains attached such that it is placed between the base 408 and the structural member 404 after construction.

The base 408 also includes additional apertures 415 that allow fasteners, such as screws or the like, to pass therethrough for attaching the structural member 404 to the shear connector 400. In some embodiments, the apertures 415 are generally equally spaced at intervals of about two inches (2"), about four inches (4"), or about six inches (6"). In the illustrated embodiment, the apertures 415 are spaced at intervals of about two inches (2") between adjacent apertures 416 and about four inches (4") between apertures separated by the hooked arms 412. The spacing of the apertures 415 can vary widely. In embodiments where the retaining strip 410 remains attached to the base 408 when the shear connector 400 is attached to the structural member 404, the retaining strip 410 can have apertures that correspond to the apertures 415 on the base 408.

At the end of the hooked arms 412, which are inserted into the base 408, the hooked arms 412 include a retaining member 416 for allowing the hooked arm 412 to remain inserted in the base 408 after being placed within the base 408. In some embodiments, the retaining member 416 takes the form of wings or bayonets allowing the hooked arms 412 to be inserted from above the base 408. This snap-fit connection mechanism may also take the form of other deformable protrusions that significantly deform when subject to forces in one direction (i.e., during insertion into the base 408) but which provide significant resistance when subject to forces in the opposite direction (i.e., during removal from the base 408). In some embodiments, the hooked arms 412 can be inserted through the bottom of the base 408 and therefore could use non-deformable retaining members 416.

The hooked arms 412 also have an extension portion 418 that extends from the retaining member 416. A fillet 419 can be placed at the edge of the retaining member 416 and the extension member 420 in order to reduce localized stresses and reduce the possibility of failure at these points of the shear connector 400. At the other end of the hooked arms 412 are hooked members 420 configured to chair up the reinforcing mesh 406. In the illustrated embodiment, the hooked arms 412 only have a single hooked member 420 extending in a single direction. In other embodiments, a dual-member design, such as that of shear connector 200, can be used.

In some embodiments, the length of the hooked arm 412, defined as the distance between the inside surface 422 of the base 408 and the uppermost portion of the inside surface 424 of the hooked member 420, can range from about one inch (1") to about two inches (2"). In the illustrated embodiment, the length of the hooked arm is about one and a quarter inches (1¼").

The base 408 can be manufactured from a variety of materials such as, but not limited to, fiber reinforced polymer composite materials. In the illustrated embodiment, the base 408 is manufactured from a composite, such as glass fiber reinforcement in a vinyl ester resin matrix. The retaining strip 410 can also be manufactured from the same materials as the base 408. However, in some embodiments where the retaining strip 410 is discarded prior to attaching the shear connector 400 to the structural member 404, the retaining strip 410 may instead be manufactured from cheaper materials. The individual hooked arms 412 can also be manufactured from a variety of materials such as, but not limited to, metals including stainless steel and titanium, composites, and plastics. In the illustrated embodiment, the hooked arms 412 are manufactured from plastics. Separating the shear connector 400 into multiple components can significantly reduce the costs of manufacture by allowing, for example, the base 408 and the retaining strip 410 to be extruded with little post-manufacturing processing such as milling thus reducing costs associated with labor and material waste. The individual hooked arms 412 can then be cast separately.

With continued reference to FIG. 11, as with the other shear connectors 100, 200, 300 described above, the base 408 has a width that generally corresponds to the width of the structural member 404 attached thereto. In the illustrated embodiment, the base 408 has a width of about one and five-eighths of an inch (1⅝") and a length of about four feet (4'), though many variations in the length and width of the base 408 are possible. Furthermore, in some embodiments, the thickness of the base 408, defined as the distance between a bottom-most surface and a top-most surface of the base 408, can range from about one-sixteenth of an inch (1/16") to upwards of about an inch (1") or more. In the illustrated embodiment, the thickness of the base is about three-tenths of an inch (3/10"). However, in embodiments where the base 408 is spaced from the building panel 402, the thickness can advantageously be reduced. In other embodiments, the thickness can be increased to further increase the U-value of the system.

Shear Connector Assemblies

Figure 19:
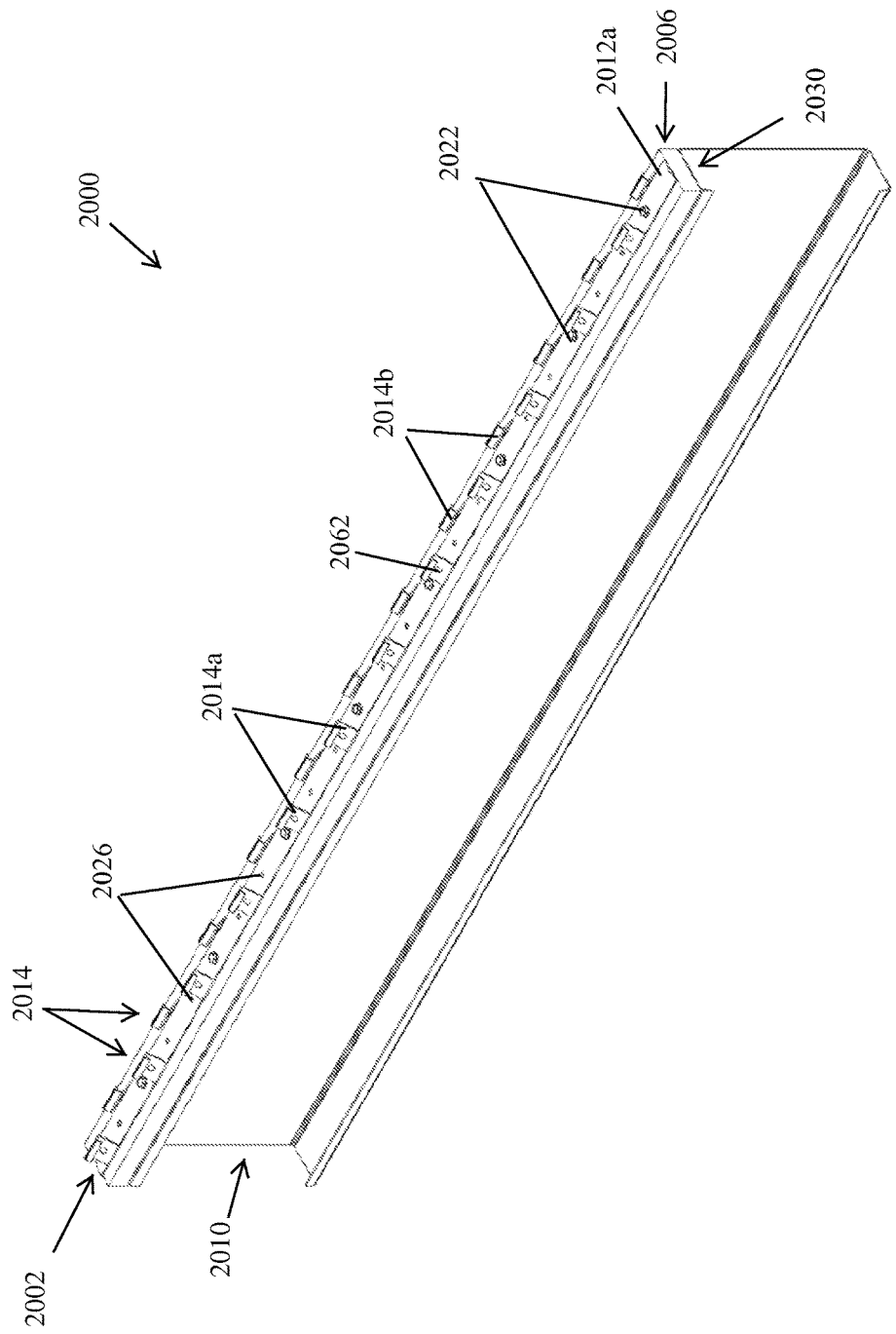
FIG. 19 is a perspective view of another embodiment of a shear connector assembly.
Figure 20:
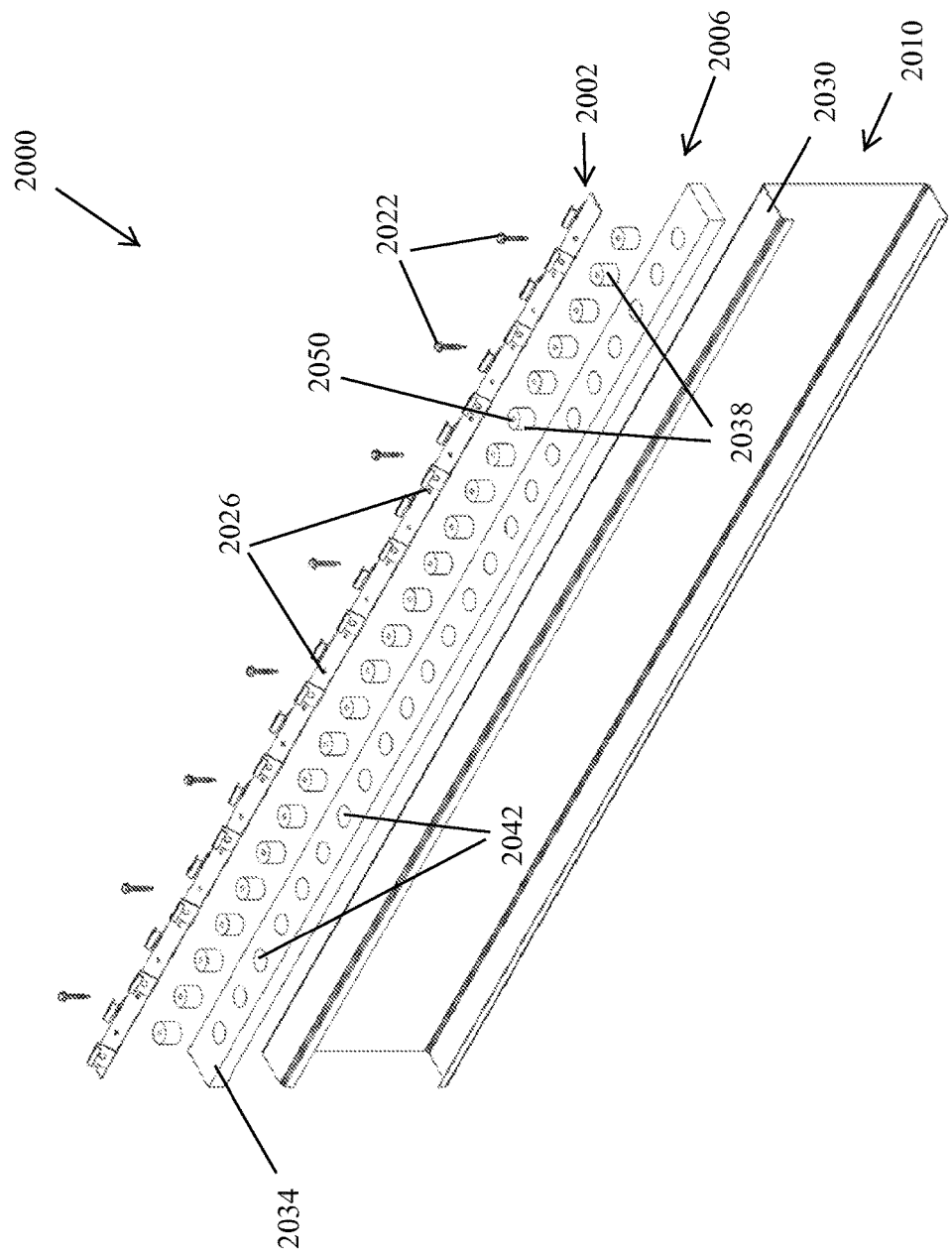
FIG. 20 is an exploded perspective view of the shear connector assembly of FIG. 19.
Figure 21:
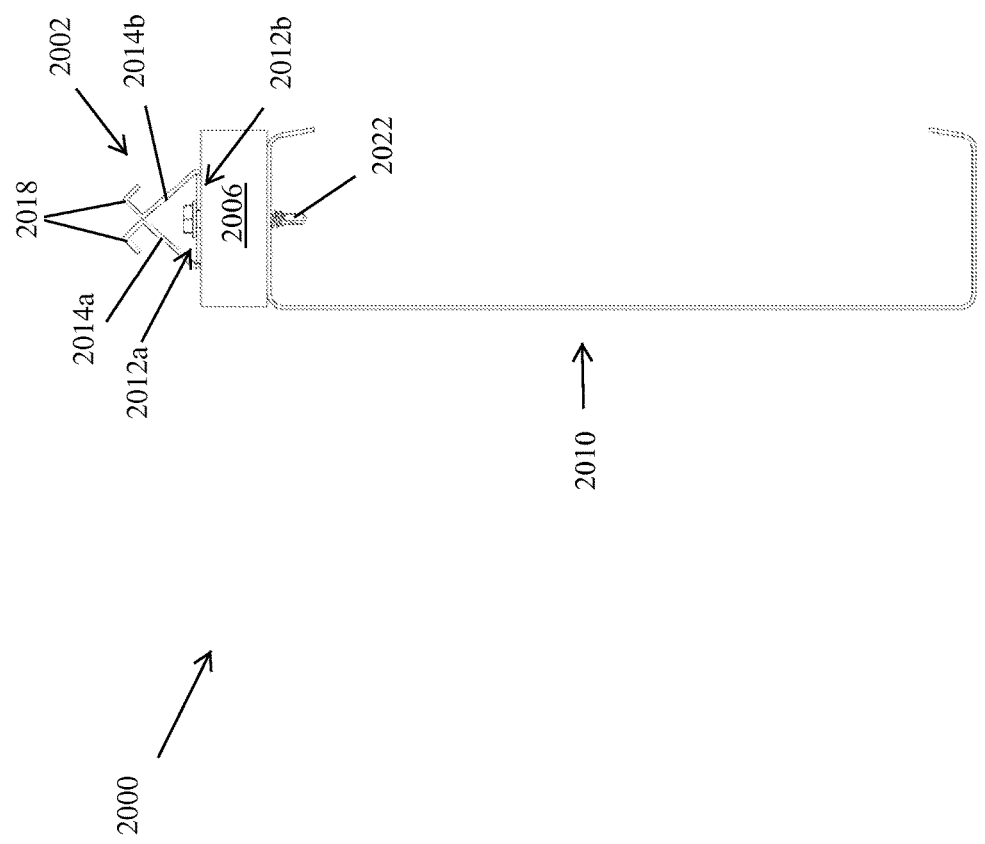
FIG. 21 is an end view of the shear connector assembly of FIG. 19.

FIGS. 19-21 illustrate an embodiment of a shear connector assembly 2000. The shear connector assembly 2000 can include a connector strip 2002 and a spacer assembly 2006. The connector strip 2002 can be connected to a spacer assembly 2006. The shear connector assembly 2000 can be connected to a structural member 2010. In some embodiments, the spacer assembly 2006 is positioned between the connector strip 2002 and the structural member 2010.

As illustrated in FIG. 21A, the shear connector assembly 2000 can be sized, shaped, constructed, and otherwise configured to reduce heat transfer between a building panel 2060 (e.g., wall panel and/or concrete panel) and the structural member 2010. All or a portion of the connector strip 2002 can be embedded in the building panel 2060. In some embodiments, as explained in further detail below, the connector strip 2002 can be connected to a mesh 2020 within the panel 2060. Limiting or reducing heat transfer between the structural member 2010 and the building panel 2060 can reduce heat transfer between the interior and exterior of a building.

Figure 22:
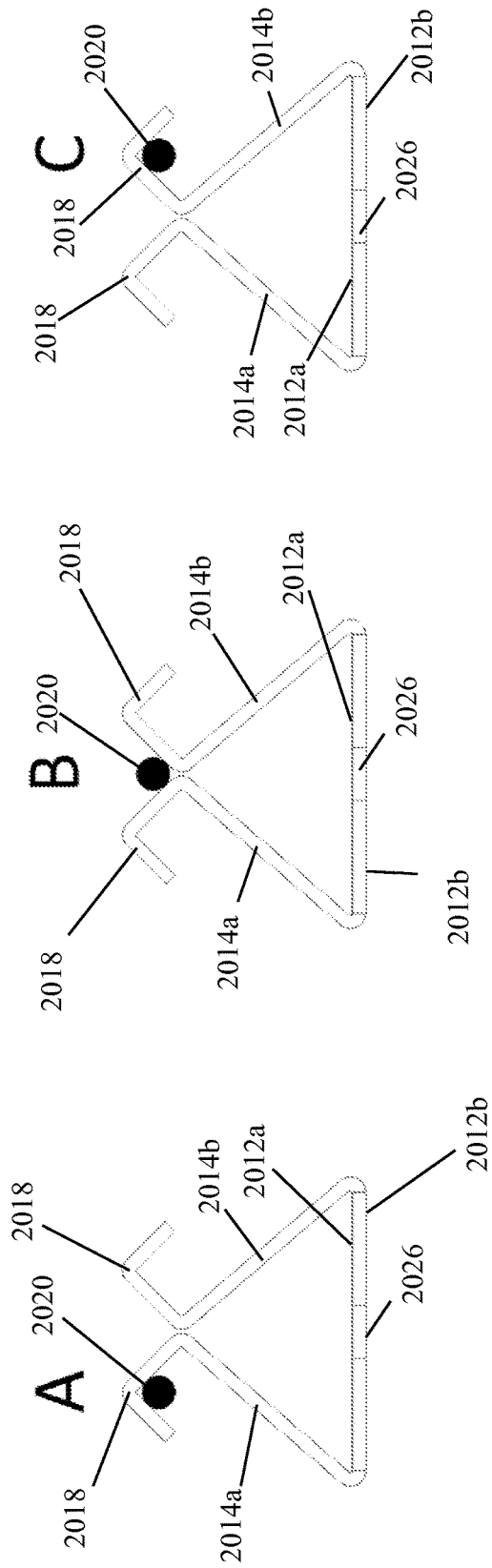
FIG. 22 is an end view of the connector strip of the shear connector assembly of FIG. 19 with varying mesh connection positions.

As illustrated in FIGS. 21 and 22, the connector strip 2002 can include a first face 2012a and a second face 2012b opposite the first face 2012a (FIG. 21). In some embodiments, the connector strip 2002 is approximately one inch wide. In some embodiments, the connector strip 2002 is less than or greater than two inches wide. In some applications, the connector strip 2002 is narrower than the structural member 2010 (e.g., connecting flange 2030) onto which the shear connector assembly 2000 is installed. In some cases, the connector strip 2002 is between 1 inch and 18 inches, between 1 and 3 feet, between 1.2 and 6 feet, between 3 and 5 feet, and/or between 6 and 12 feet long. In some embodiments, the connector strip 2002 is approximately 4 feet long. The connector strip 2002 and/or shear connector assembly 2000 can be trimmed to a desired length at a job site. In some embodiments, the connector strip 2002 is constructed form metal (e.g., a galvanized steel such, as for example, 18 gauge galvanized steel). In some embodiments, the connector strip is constructed from a polymer or composite material (e.g., fiber reinforced polymer composite material.

The connector strip 2002 can include a plurality of hooked elements 2014. For example, the connector strip 2002 can include a first row of hooked elements 2014a extending from the first face 2012a. In some embodiments, the connector strip 2002 includes a second row of hooked elements 2014b extending from the first face 2012a. The first and second rows of hooked elements 2014a, 2014b can extend from opposite lateral edges of the first face 2012a. In some embodiments, the first and second rows of hooked elements 2014a, 2014b extend from some other portion of the first face 2012a between the lateral edges of the first face 2012a of the connector strip 2002.

The hooked elements 2014a, 2014b can be spaced along a length of the connector strip 2002 in fixed or varying intervals. For example, the hooked elements 2014a, 2014b can be spaced at one inch, two inch, three inch, four inch, five inch, or six inch intervals. Intervals greater than, smaller than, or in between the above-listed intervals may be used. The hooked elements 2014a, 2014b can have a width (e.g., as measured along the length of the connector strip 2002) of about one half inch, about one inch, about two inches, about three inches, or some other width greater than, less than, or between one half and three inches.

As illustrated in FIGS. 21 and 22, the first and second rows of hooked elements 2014a, 2014b can extend away from the first face 2012a of the connector strip 2002 and toward each other. In some embodiments, the hooked elements 2014a, 2014b includes hooks 2018. The hooks 2018 of the first row of hooked elements 2014a can be configured to open in a direction away from the hooks 2018 of the second row of hooked elements 2014b. The hooks 2018 of the second row of hooked elements 2014b can be configured to open in a direction away from the hooks 2018 of the first row of hooked elements 2014a. Configuring the hooks 2018 to open away from each other can facilitate chairing a reinforcing mesh 2020 on either side (e.g., left and right in the perspective of FIG. 21) of the shear connector assembly 2000 (see, e.g., configurations "A" and "C" in FIG. 22). Twisted wire or other tying devices may be used to attach the reinforcing mesh 2020 to the hooks 2018. Positioning the mesh 2020 at least partially within the hooks 2018 can increase pullout strength of the connector strip 2002 with respect to concrete and/or can help to ensure uniform mesh depth within the concrete (e.g., or other material) of building panel 2060. In some embodiments, the reinforcing mesh 2020 can be chaired between the hooks 2018 of the hooked elements 2014a, 2014b (see, e.g., configuration "B" in FIG. 22). In some such embodiments, the hooked elements 2014a, 2014b form a notch in which the reinforcing mesh 2020 can be seated. In some embodiments, the hooks 2018 of one or both of the first and second rows of hooked elements 2014a, 2014b open toward the hooked elements of the opposite row.

In some embodiments, one or more of the hooked elements 2014 can be replaced with alternative protuberances such as, for example, perforated tabs, knob-shaped studs, u-shaped rods, or threaded bolts to increase pull out strength of the connector strip 2002 with respect to the concrete of building panel 2060.

The shear connector assembly 2000, or some subcomponent thereof (e.g., the connector strip 2002), can be attached to the structural member 2010 via fasteners, adhesives, welding, or another connecting method and/or structure. Preferably, the shear connector assembly 2000 is attached to the structural member 2010 via one or more fasteners 2022 (e.g., screws, self-drilling screws, rivets, or other fasteners). For example, the connector strip 2002 can include a plurality of holes 2026 through which the fasteners 2022 may be inserted. The fasteners 2022 may pass through a portion (e.g., a connecting flange 2030) of the structural member 2010. Nuts, washers, welding, and/or other connecting methods and structures may be used to affix the fastener 2022 to the connector strip 2002, to the spacer assembly 2006, and/or to the structural member 2010. The fasteners 2022 may be distributed at fixed or variable intervals along the length of the shear connector assembly 2000. For example, the fasteners 2022 may be spaced every 6 inches, every 4 inches, or at another interval. Additional shear connector assemblies 2000 can be abutted to the first installed shear connector assembly 2000 and installed on the structural members 2010 until all of a desired portion of the exposed framing (e.g., structural elements) are covered by shear connector assemblies 2000. In some embodiments, the shear connector assemblies 2000 can be installed on the structural members 2010 with gaps between adjacent shear connector assemblies 2000. In some embodiments, the fasteners 2022 are configured to bear shear loads between the building panel 2060 and the structural members 2010.

As illustrated in FIG. 21, the spacer assembly 2006 can be positioned between the connector strip 2002 and the structural member 2010 when the structural member 2010 and shear connector assembly 2000 are connected. In some embodiments, the spacer assembly 2006 (e.g., the supports 2038 and/or strip 2034) is connected to the connector strip 2002 via adhesives, welding, fasteners, and/or via some other connecting method or structure. For example, a spray or pressure sensitive adhesive film can be used to adhere the spacer assembly 2006 to the connector strip 2002. The spacer assembly 2006 can be configured to limit conductive and/or radiant heat transfer between the connector strip 2002 and the structural member 2010, as well as between the building panel 2060 and the structural member 2010.

As illustrated in FIG. 20, the spacer assembly 2006 can include an insulative strip 2034. The height of the strip 2034 (e.g., the vertical dimension of the strip 2034 in FIG. 21) can be between 0.1 and 0.5 inches, between 0.25 and 0.75 inches, between 0.6 and 1.5 inches, and/or between 1 and 3 inches. Preferably, the height of the strip 2034 is approximately 0.75 inches. The width of the strip 2034 (e.g., the horizontal dimension of the strip 2034 in FIG. 21) can be between about 0.1 and 0.6 inches, between about 0.25 and 1.2 inches, between about 0.9 and 2.5 inches, and/or between about 1.5 inches and 3 inches. Preferably, the width of the strip 2034 is approximately 2 inches. In some embodiments, the strip 2034 is sized to cover all or substantially all of the structural member 2010 (e.g., all of the surface of the connecting flange 2030 facing the spacer assembly 2006). Covering all or substantially all of the structural member 2010 with the insulative strip 2034 can reduce conductive and/or radiative heat transfer between the structural member 2010 and the building panel 2060.

The insulative strip 2034 can be constructed from a low thermal conductivity material. For example, the insulative strip 2034 can be constructed form a material having a thermal conductivity of less than 3.0 W/m·° K, less than 2.0 W/m·° K, less than 1.0 W/m·° K, less than 0.75 W/m·° K, less than 0.6 W/m·° K, less than 0.5 W/m·° K, and/or less than 0.1 W/m·° K. In some embodiments, the insulative strip 2034 is constructed from a foam (e.g., a rigid or semi-rigid foam). Examples of materials suitable for the insulative strip include, but are not limited to, expanded polystyrene ("EPS") foam, phenolic foam, polyurethane foam, and polyisocyanurate foam. In some embodiments, the density of the material used for the insulative strip 2034 is between about 0.5 pounds per cubic foot and 30 pounds per cubic foot. Many variations in the density of the insulative strip 2034 are possible. Preferably, the insulative strip 2034 is constructed from an EPS foam having a density of approximately 2 pounds per cubic foot.

In some embodiments, the insulative strip 2034 is a hollow strip. For example, the strip can be constructed as a hollow strip from materials such as, for example, a fiber reinforced polymer, plastics, and/or rigid foams (e.g., rigid or semi-rigid foams The hollow strip may be filled with additional insulation such as, for example, spray foam (e.g., phenolic, polyisocyanurate, polyurethane), rigid foam (e.g., EPS, phenolic, polyisocyanurate, polyurethane), loose-fill insulation (e.g., cellulose, fiberglass, mineral wool), and/or long discontinuous fiber (e.g., fiberglass mat or roll) insulation. In some embodiments, the hollow strip is left empty (with the exception of the supports 2038).

Figure 24:
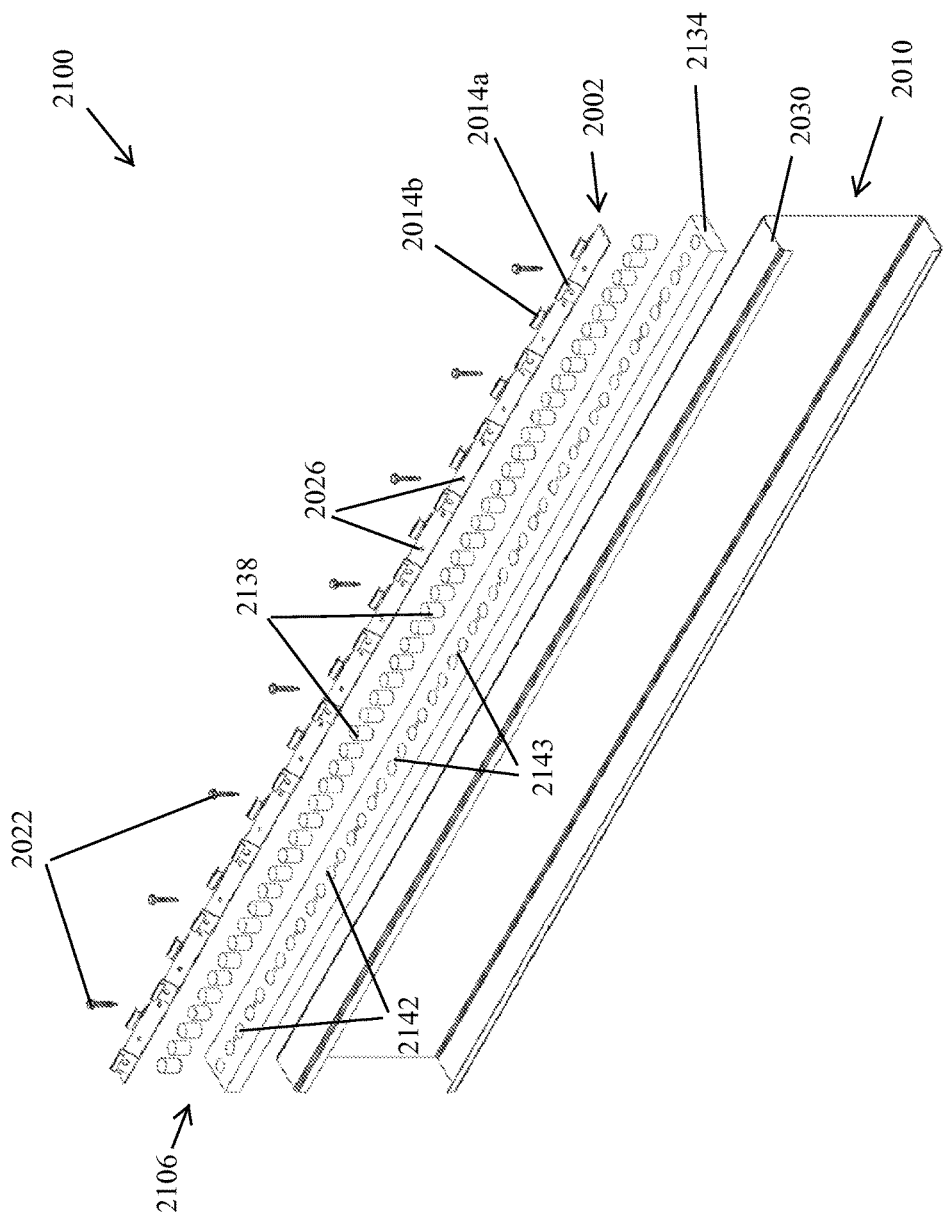
FIG. 24 is an exploded perspective view of another embodiment of a shear connector assembly.

As illustrated in FIG. 20, the spacer assembly 2006 can include supports 2038. The supports 2038 can be sized and shaped to fit within apertures 2042 of the insulative strip 2034. The apertures 2042 can be spaced at uniform or non-uniform intervals along the length of the strip 2034. For example, the aperture 2042 can be spaced at one inch, 1.5 inch, 2 inch, 4 inch, and/or some other interval along the length of the strip 2034. In some embodiments, the supports 2038 have a cylindrical or generally cylindrical shape. In some embodiments, the overall size of the supports 2038 (e.g., in the directions parallel to the second surface 2012b of the connector strip 2002) can be slightly (e.g., within 10%) larger than the apertures 2042 to ensure a tight fit between the supports 2038 and the insulative strip 2034. In some embodiments, the supports 2038 and apertures 2042 have diameters of between about 0.1 inches and 2 inches. Preferably, the diameter of the supports 2038 and aperture 2042 are approximately 0.6 inches. In some embodiments, supports 2038 have substantially the same height (e.g., height normal to the second surface of the connector strip 2002) as the insulative strip 2034. For example, the strip 2034 and/or supports 2038 can be between about 0.25 inches and about 2 inches tall. Preferably, the strip 2034 and supports 2038 are about 0.75 inches tall. In some embodiments, the supports 2038 and/or apertures 2042 of the insulative strip 2002 are aligned with the holes 2026 in the connector strip 2002 when the spacer assembly 2006 is connected to (e.g., adhered to) the connector strip 2002. In some embodiments, one or more of the supports 2038 includes a through-aperture 2046. The through-apertures 2046 may be aligned with the holes 2026 to permit passage of the fasteners 2022 therethrough. In some embodiments, the holes 2026 are aligned between the supports 2038 to facilitate passage of the fasteners 2022 through the spacer assembly 2006 without passing through a support 2038 (FIG. 24).

Figure 23:
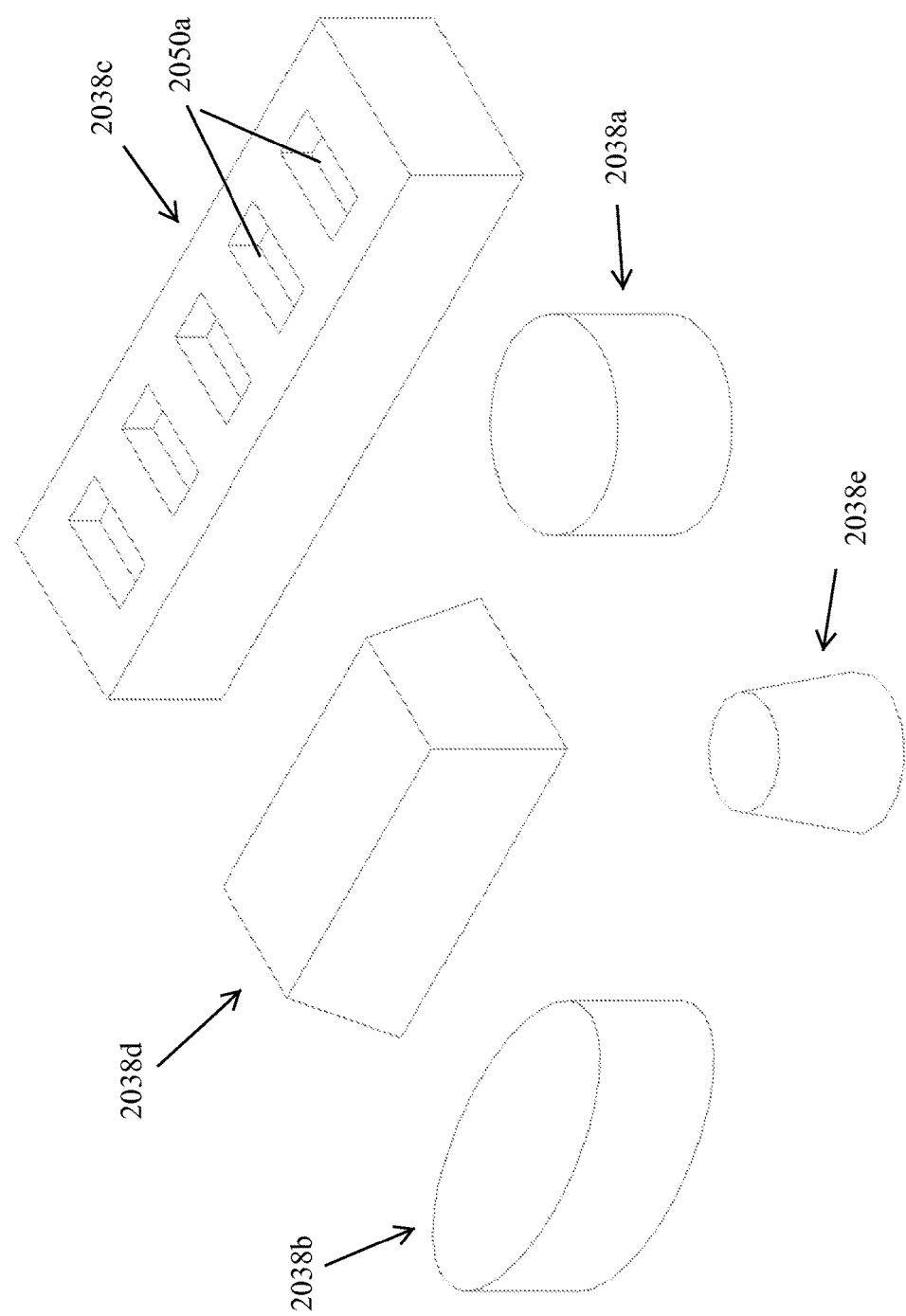
FIG. 23 is a perspective view of varying support member geometries.

As illustrated in FIG. 23, the support 2038 can have varying shapes. For example, as explained above, the supports may be cylindrical (2038a). In some embodiments, the supports have an elliptical or oval-shape (2038b). The supports can have a generally rectangular or polygonal shape (2038c). Many shapes, both regular and irregular, are possible. In some embodiments, the supports are tapered such that one side (e.g., a top or bottom side in the frame of reference of FIG. 23) is larger than another (2038d and 2038e). The supports can be solid, hollow and/or can include apertures (2050a). The apertures can be configured to receive the fasteners 2022. In some embodiments, the load bearing surfaces (e.g., the surfaces in contact with the structural member 2010 or connector strip 2002) of the supports 2038 include one or more recesses to reduce conductive heat transfer to, from, and through the supports 2038.

The supports 2038 can be configured to bear and transfer load between the building panel 2060 (e.g., the connector strip 2002 when it is embedded in the building panel 2060) and the structural member 2010. In some embodiments, the supports 2038 are constructed from structural (e.g., load-bearing) material(s). The supports 2038 can be constructed and/or otherwise configured to have high compressive strength and low thermal conductivity. For example, the supports 2038 can be configured to have a thermal conductivity of less than 0.5 W/m·° K, less than 0.75 W/m·° K, less than 1.0 W/m·° K, less than 1.5 W/m·° K, and/or less than 2.5 W/m·° K. In some embodiments, the supports 2038 have a thermal conductivity of less than 4 W/m·° K. The supports 2038 can have a compressive strength (e.g., parallel or substantially parallel to the thickness of the supports 2038) of at least 200 pounds per square inch, at least 300 pounds per square inch, at least 500 pounds per square inch, at least 800 pounds per square inch, at least 1000 pounds per square inch, at least 1200 pounds per square inch, at least 1500 pounds per square inch, at least 3000 pounder per square inch, and/or at least 5000 pounds per square inch.

The supports 2038 can be constructed to a have a density. For example, the supports 2038 can be constructed from a material having a density below 500 pounds per cubic foot, below 400 pounds per cubic foot, below 250 pounds per cubic foot, below 150 pounds per cubic foot, and/or below 75 pounds per cubic foot. In some embodiments, the supports 2038 are constructed from a material having a density below 130 pounds per cubic foot.

The supports 2038 can be constructed from a non-combustible load-bearing material such as, for example, a cementitious material. In some embodiments, the supports are constructed from lightweight concretes. For example, the supports 2038 can be constructed from cement, lightweight aggregates, and water blended together into molds or forms. The supports 2038 can be further refined by machining or grinding to achieve a uniform or substantially uniform load bearing surface. In some embodiments, materials suitable for the support 2038 include foamed or autoclave aerated concrete, fiber reinforced calcium silicate, fiber reinforced cement board, and/or fiber reinforced polymer composites (e.g., in applications where lower maximum use temperatures can be tolerated).

In some embodiments, the supports 2038 are constructed from 100% portland cement. In some cases, the supports 2038 are constructed from portland cement combined with one or more supplementary materials such as, for example, fly ash, ground granulated blast furnace slag, limestone fines, silica fume, and natural pozzolans which may include calcined shale, calcined clay, or metakaolin. Chemical admixtures such as accelerators and plasticizers may also be added to portland cement to reduce cure time and improve workability, respectively. In some embodiments, air entraining admixtures or glass microspheres may be added to reduce concrete density and thermal conductivity, as well as increase strength. In one preferred embodiment lightweight ⅛" minus pumice aggregate is used to create a support with the desired low thermal conductivity and adequate compression strength. In some embodiments, lightweight aggregates such as perlite, foamed slag, expanded glass, and expanded clay, shale, or slate may be used to construct the supports 2038. In some embodiments, short reinforcements such as chopped fiberglass fibers (e.g., fibers approximately with lengths of approximately ⅛ inches) may be added to increase concrete tensile strength and reduce cracking. Other fibers such as polypropylene or polyethylene plastic fibers may be added or substituted to achieve similar performance improvements.

In some embodiments a ~2:1 ratio of oven dry minus pumice aggregate (e.g., ⅛ inch minus) to portland cement make up the dry components of the cementitious materials used to construct the supports 2038. Hydrated aggregate and cement can be combined then mixed with water (e.g., 0.45 parts water to 1 part cement, by weight). The cured lightweight concrete can have a nominal density of about 105 pounds per cubic foot and a nominal compression strength of about 3000 pounds per square inch.

Figure 25:
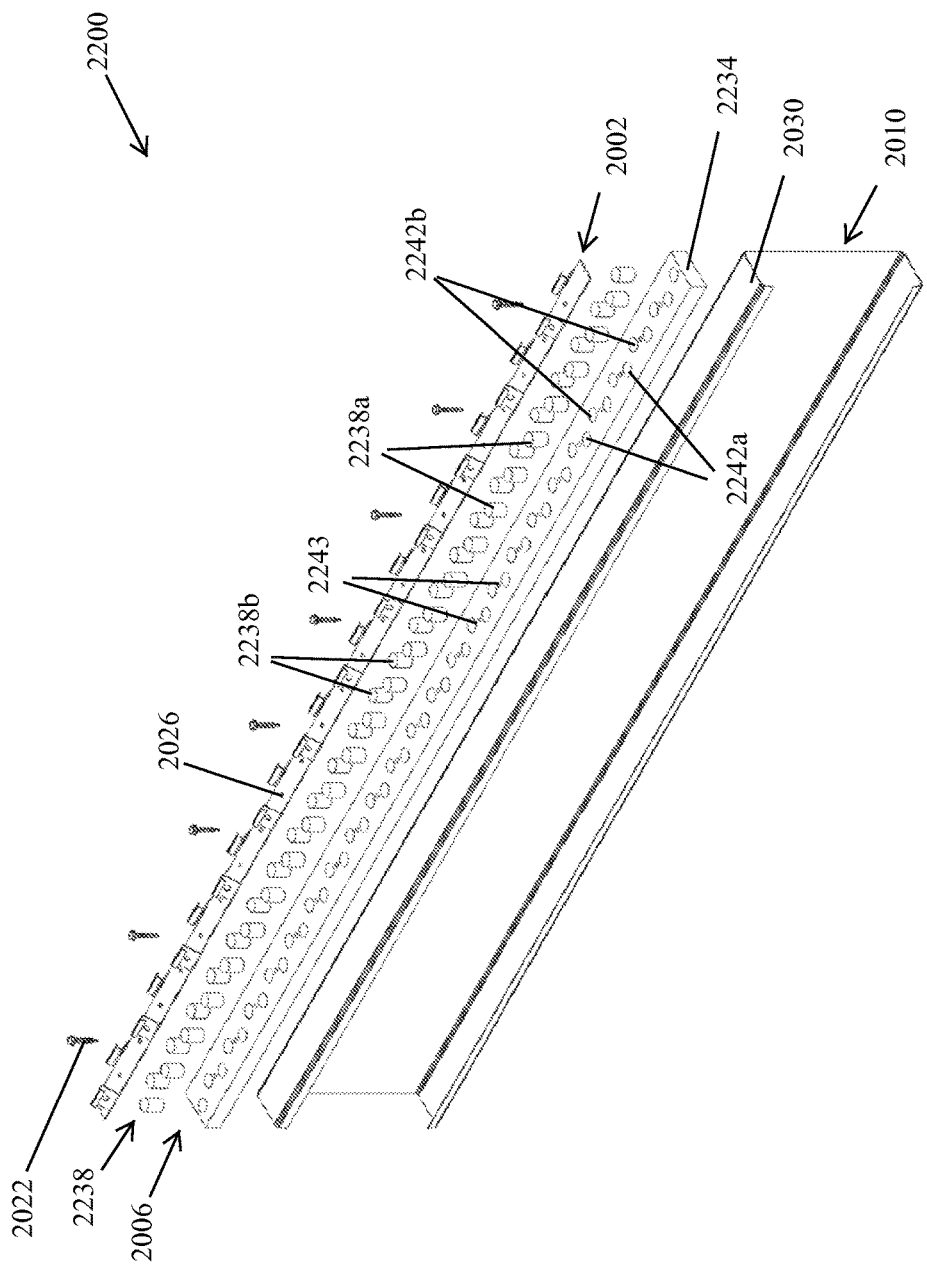
FIG. 25 is an exploded perspective view of another embodiment of a shear connector assembly.
Figure 26:
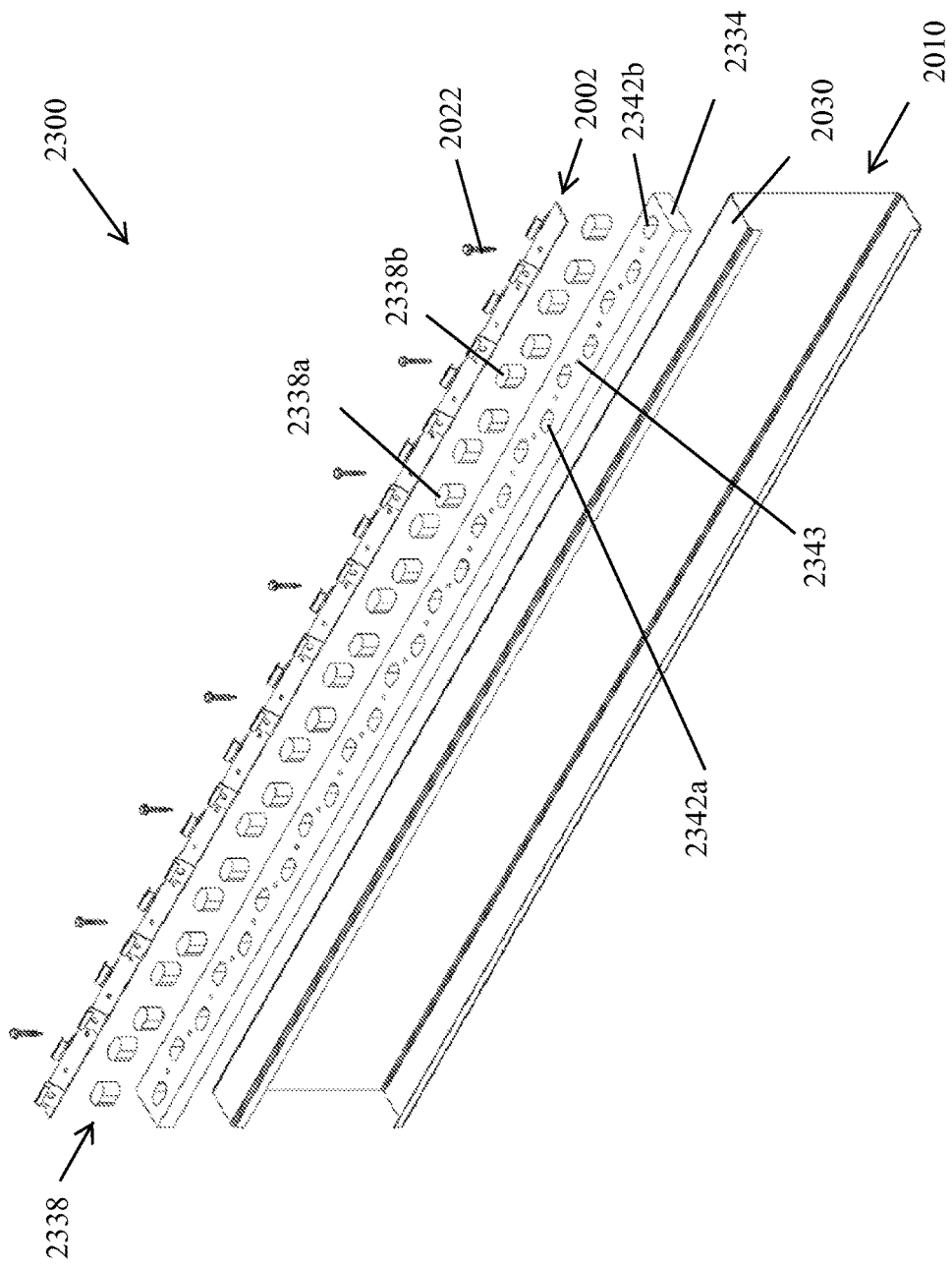
FIG. 26 is an exploded perspective view of another embodiment of a shear connector assembly.

FIGS. 24-26 illustrate embodiments of shear connector assemblies 2100, 2200, and 2300, respectively. The illustrated assemblies 2100, 2200, and 2300 may have many similar or identical features as those described above with respect to the shear connector assembly 2000. For example, the connector strip 2002 of the assemblies 2100, 2200, and 2300 may be identical or substantially identical to the connector strip 2002 of the assembly 2000. A number of differences between the assemblies 2100, 2200, and 2300 and the assembly 2000 are described below. The features of assemblies 2100, 2200, and 2300 may be used in addition to or instead of features of assembly 2000.

As illustrated in FIG. 24, the insulative strip 2134 may include both support apertures 2142 configured to receive the supports 2138 and fastener apertures 2143 configured to receive the fasteners 2022. In some such embodiments, the fasteners 2022 pass between the supports 2138 without passing through the supports 2138. The supports 2138 and insulative strip 2134 can have the same or similar overall material and physical characteristics (e.g., size, shape) as the supports 2038 and strip 2034, respectively, described above.

As illustrated in FIG. 25, the supports 2238 may be distributed in a staggered pattern (e.g., in a direction parallel to the second surface 2012b and perpendicular to the length of the connector strip 2002). In some such embodiments, the assembly 2200 includes a first row 2238a and a second row 2238b of supports 2238. The insulative strip 2234 can include staggered support apertures 2242a, 2242b to match the staggered locations of the supports 2238. Staggering the supports 2238 can provide a wider arrangement of support in the direction parallel to the second surface 2012b and perpendicular to the length of the connector strip 2002. The insulative strip 2234 can include fastener apertures 2243 between the supports 2238.

As illustrated in FIG. 26, the supports 2338 can have non-cylindrical shapes. The supports 2338 can be arranged in a straight or substantially straight distribution along the length of the connecting strip 2002. As illustrated, the supports 2338 can be staggered in a manner similar to the spaces 2238.

Figure 27:
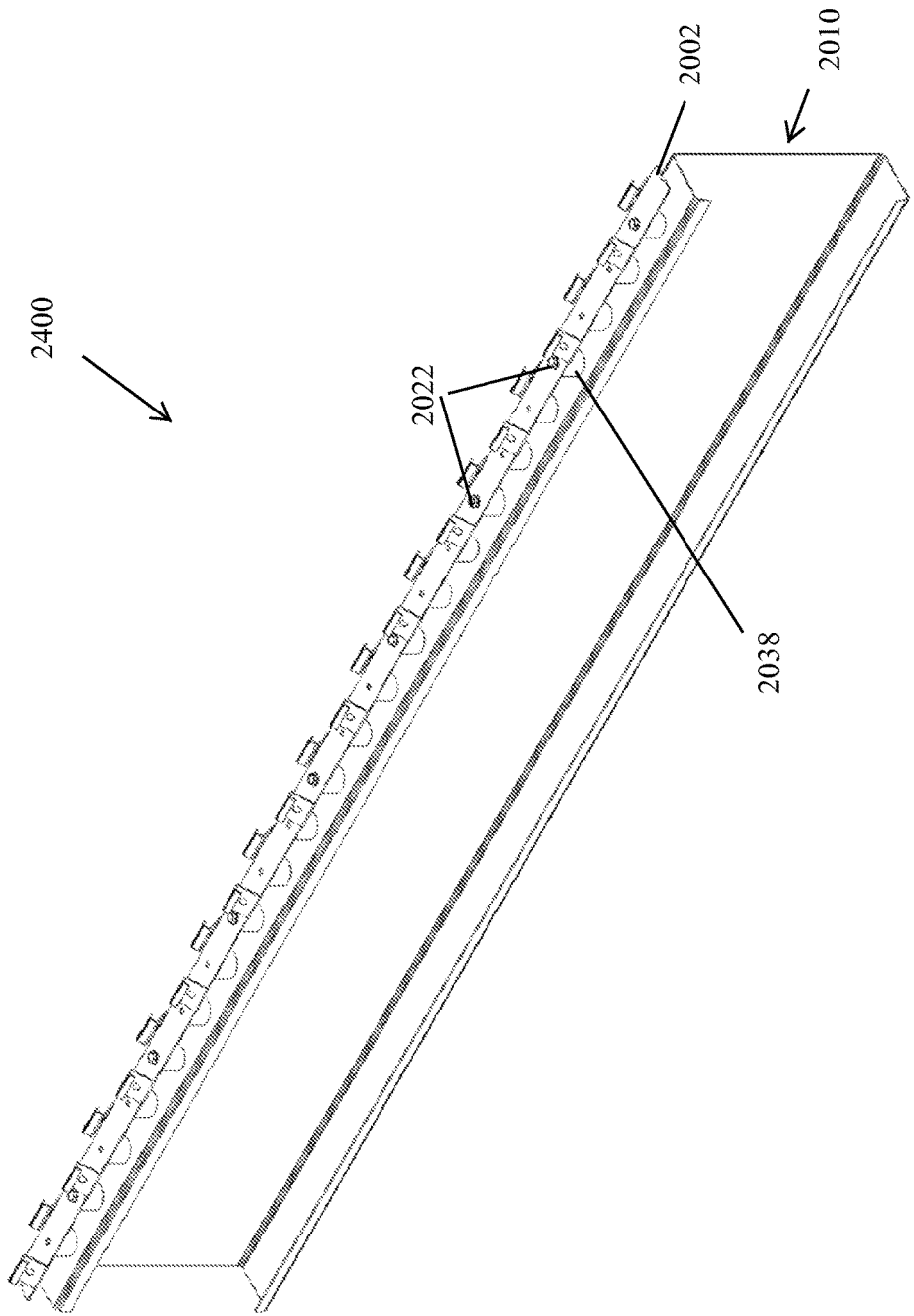
FIG. 27 is a perspective view of another embodiment of a shear connector assembly not having an insulative strip.
Figure 28:
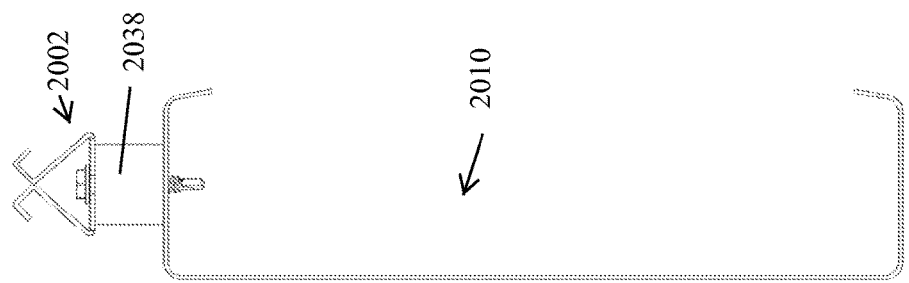
FIG. 28 is an end view of the shear connector assembly of FIG. 27.
Figure 29:
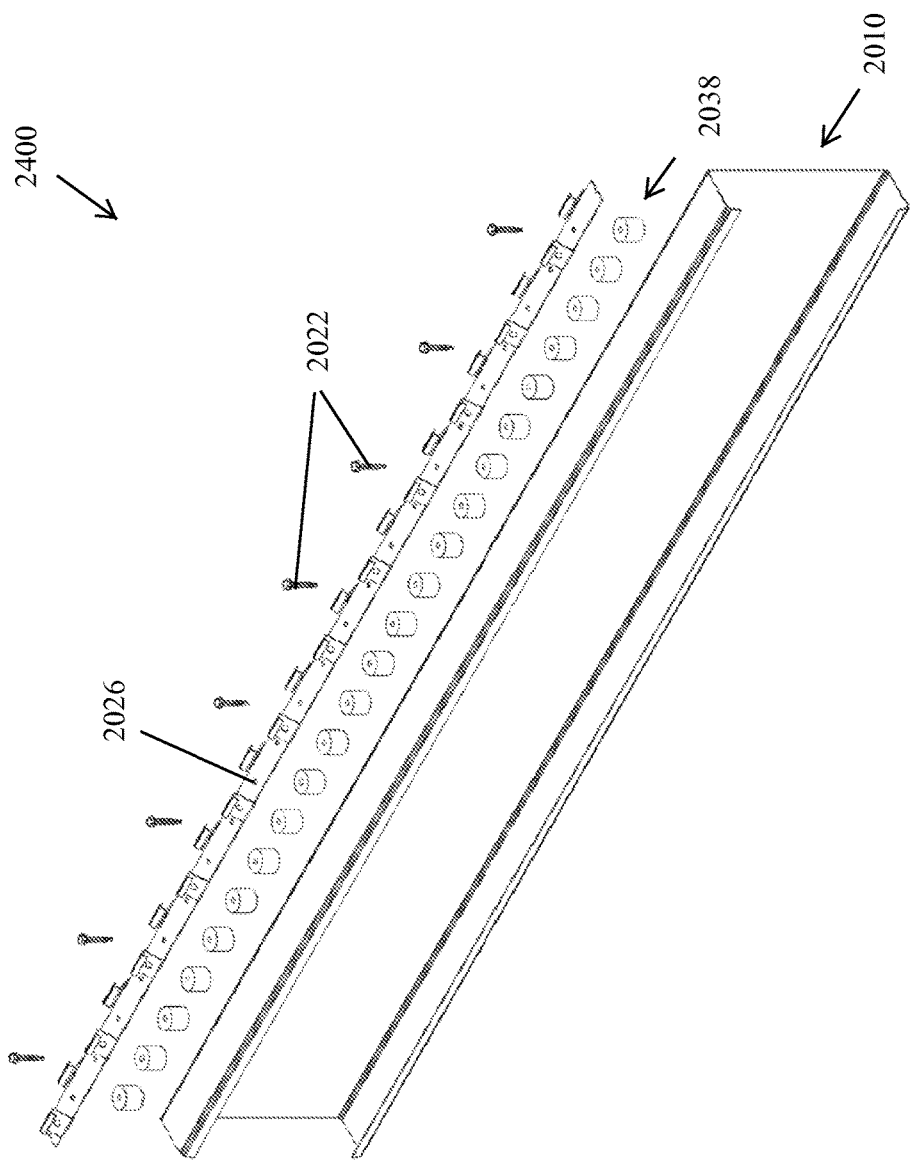
FIG. 29 is an exploded perspective view of the shear connector assembly of FIG. 27.
Figure 30:
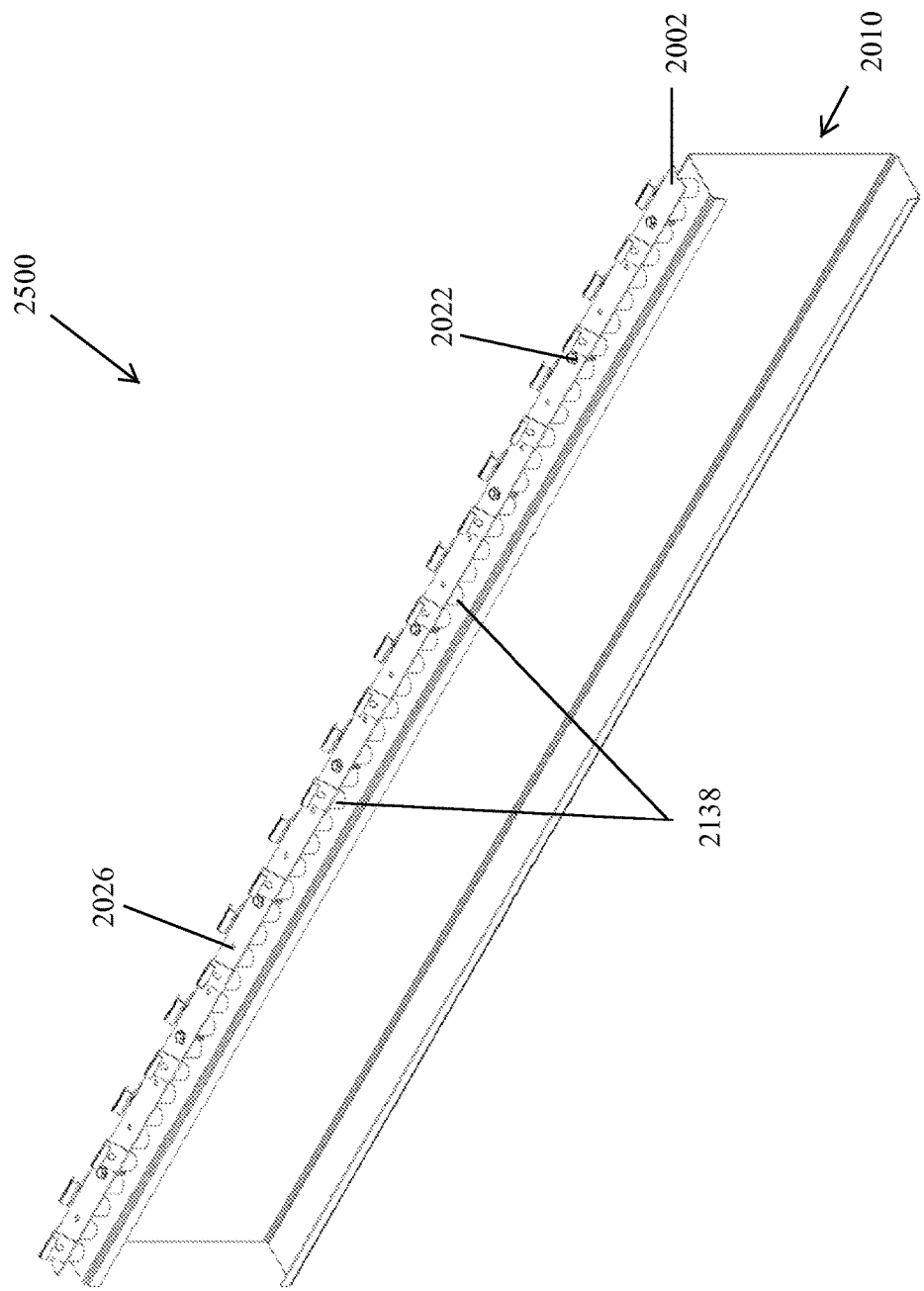
FIG. 30 is a perspective view of another embodiment of a shear connector assembly not having an insulative strip.
Figure 31:
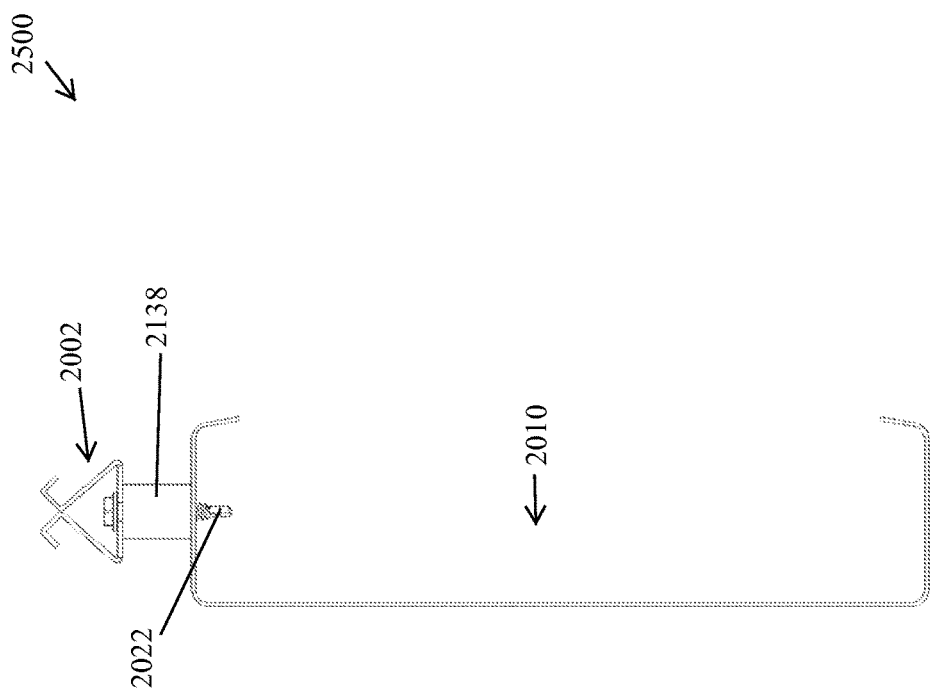
FIG. 31 is an end view of the shear connector assembly of FIG. 30.
Figure 32:
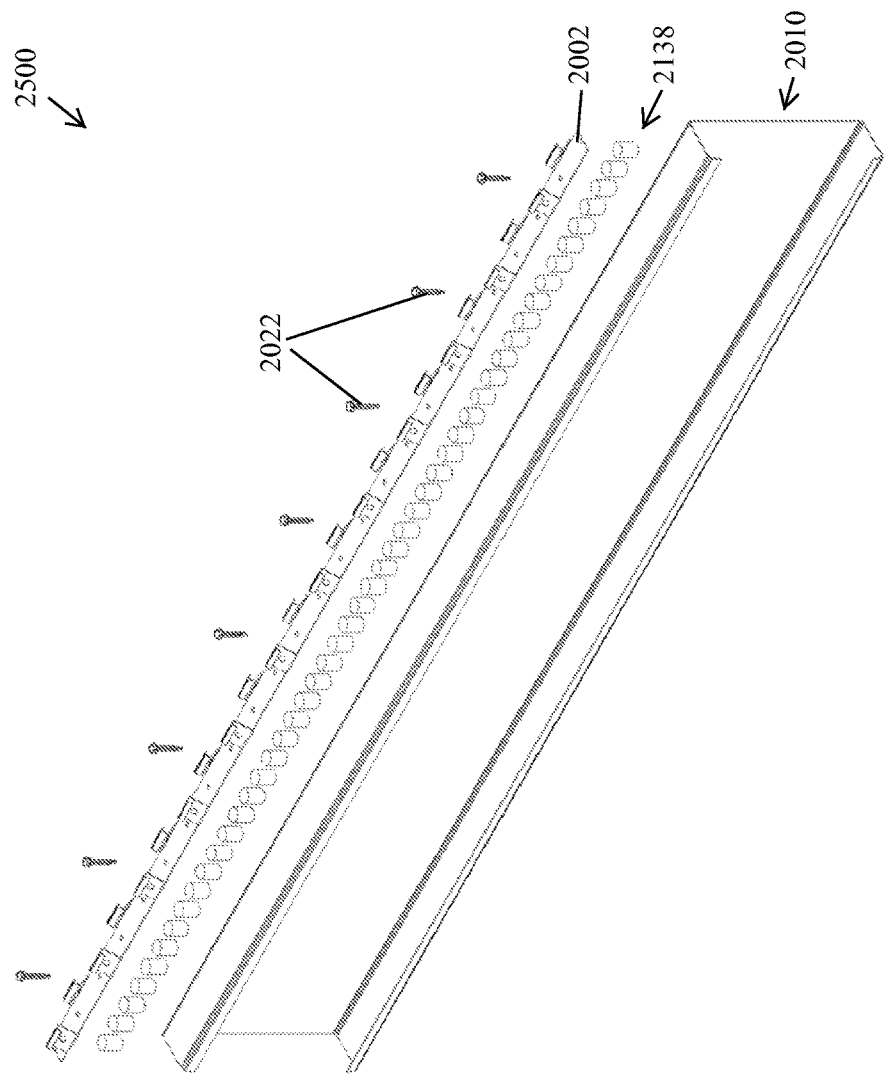
FIG. 32 is an exploded perspective view of the shear connector assembly of FIG. 30.

FIGS. 27-29 illustrate an embodiment of a shear assembly 2400 that can be similar or identical to the shear assembly 2000 described above, wherein the insulative strip 2034 is removed. Similarly, FIGS. 30-32 illustrate an embodiment of a shear assembly 2500 that can be similar or identical to the shear assembly 2100 described above, wherein the insulative strip 2134 is removed. In some such embodiments, the spaces between the supports 2038, 2138 may be filled with insulation after the shear connector assembly 2000 is connected to structural member 2010 and the building panel 2060 is cast. For example, spray foam may be used to fill the spaces between the supports.

Figure 33:
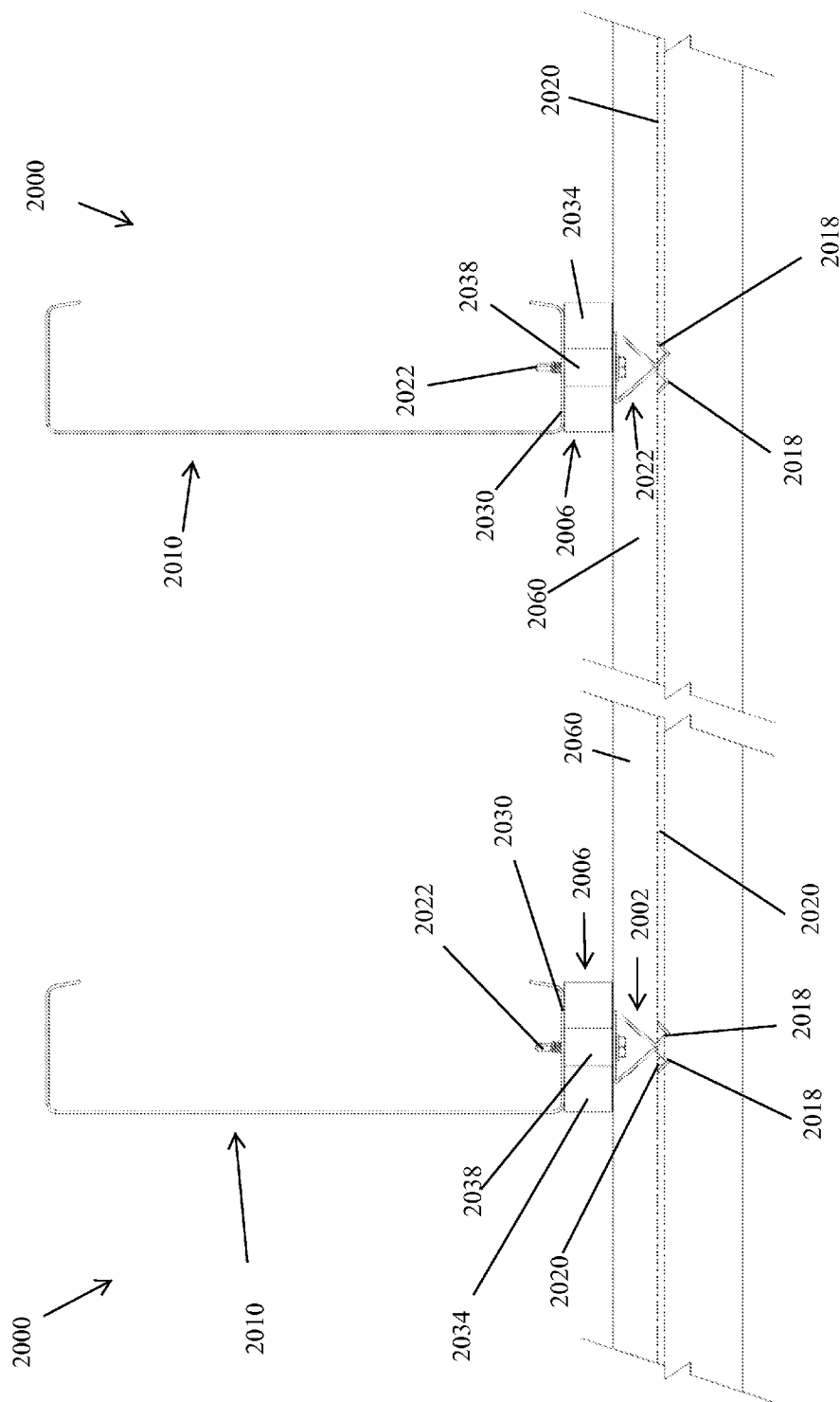
FIG. 33 is an end view of the shear connector assembly of FIG. 19 embedded in a building panel.

FIG. 33 illustrates an example of the shear connector assembly 2000 being used to chair a mesh 2020 in concrete of building panel 2060. As illustrated, the hooks 2018 can be positioned within a frame (not illustrated) into which a mesh 2020 is inserted. The mesh 2020 can be coupled to the hooks 2018 in the manners described above with respect to FIG. 22. Additionally, one or more portions of the mesh 2020 can be inserted through mesh apertures 2062 in the hooked elements 2014a, 2014b (see, e.g., FIG. 19). Engagement between the hooked elements 2014a, 2014b and hooks 2018 and the mesh 2020 can maintain the mesh 2020 in a desired depth (e.g., in the vertical direction of FIG. 33) as the concrete or other material is poured into the frame.

Figure 34:
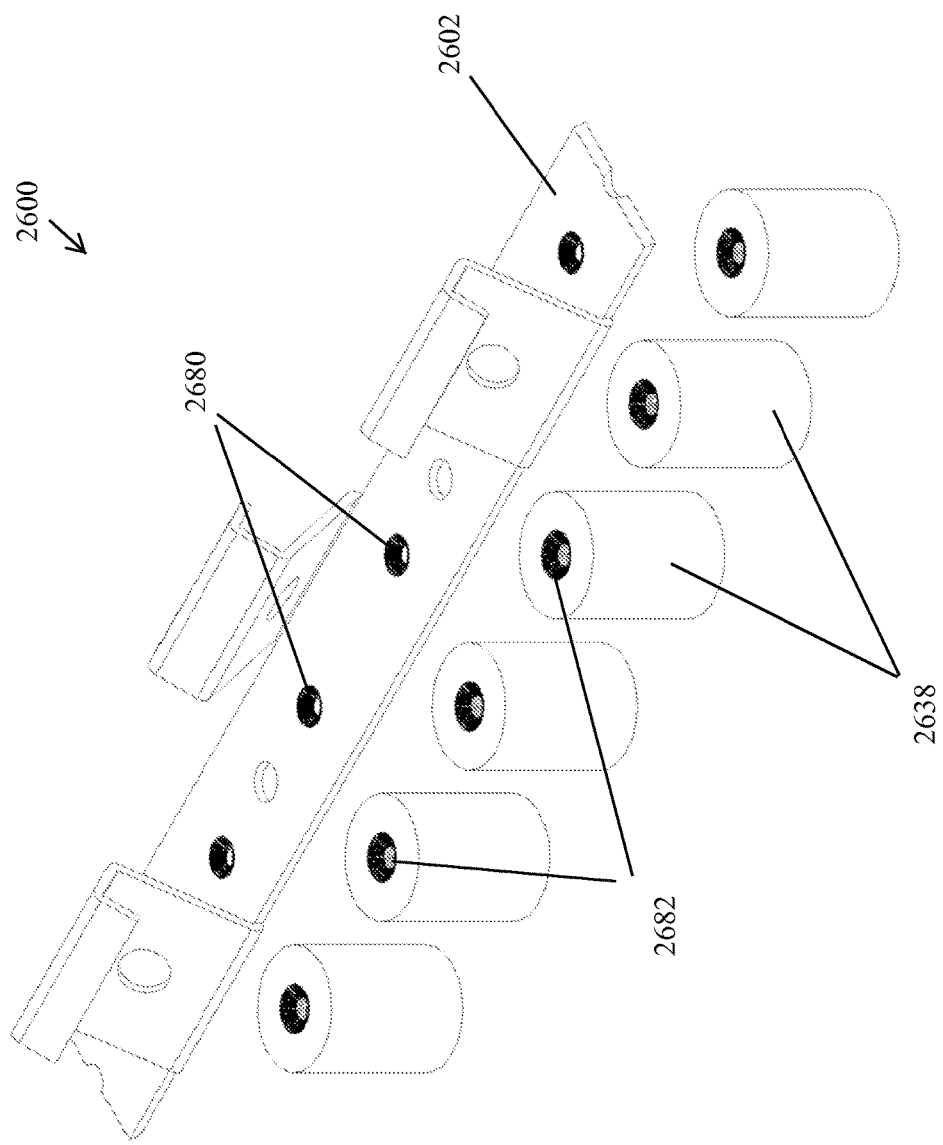
FIG. 34 is an exploded perspective view of a connector strip and support members having engagement features.
Figure 35:
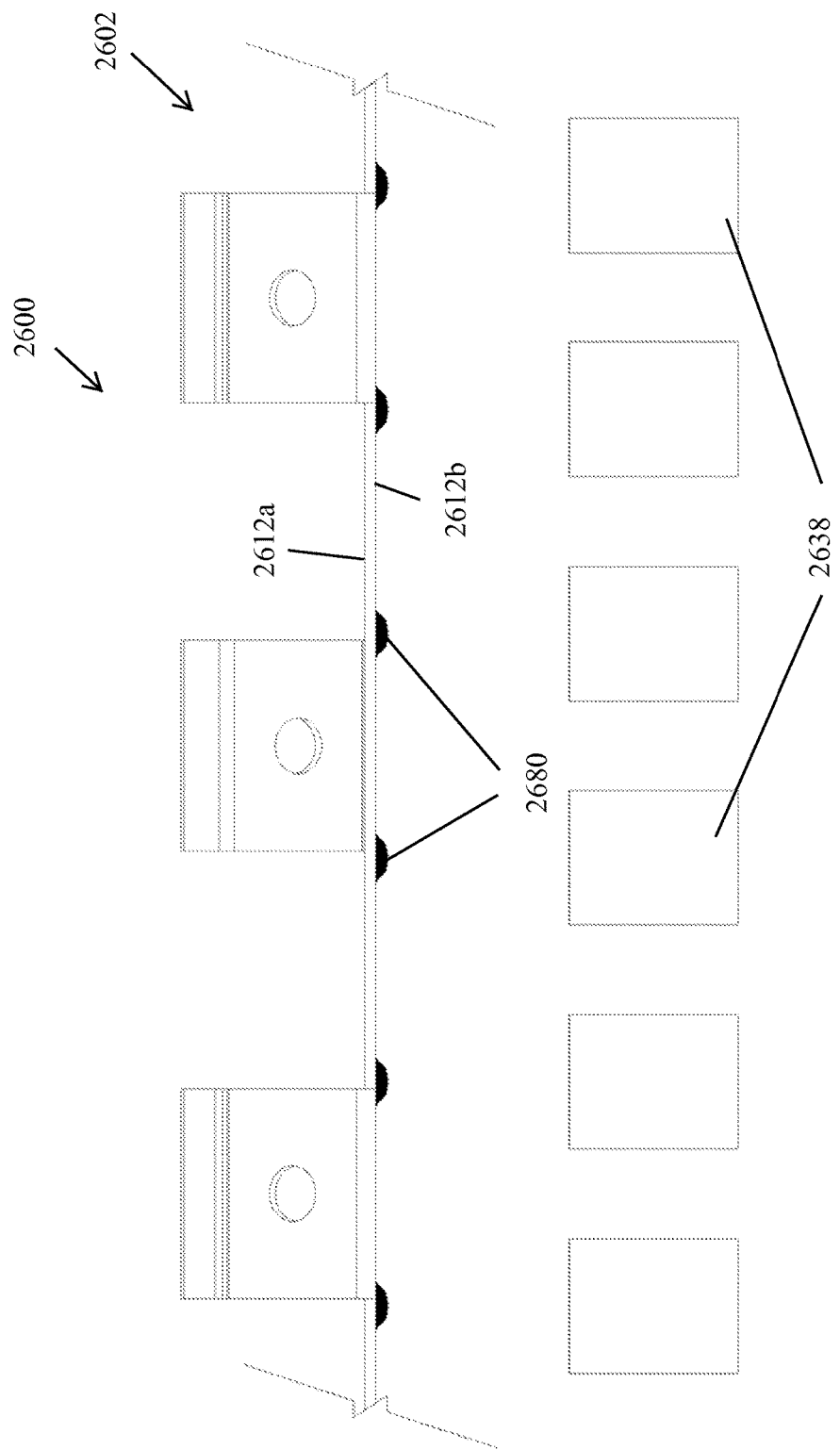
FIG. 35 is an exploded side view of the connector strip and support members of FIG. 34.

FIGS. 34-35 illustrated an embodiment of a shear assembly 2600 that can be similar or identical to the shear assembly 2000 described above. The illustrated assembly 2600 may have many similar or identical features as those described above with respect to the shear connector assembly 2000. For example, assembly 2600 may include an insulative strip (not shown) similar or identical to the insulative strip 2034 of the assembly 2000. A number of differences between the assembly 2600 and the assembly 2000 are described below. The features of assembly 2600 may be used in addition to or instead of features of assembly 2000 (e.g., and/or in addition to or instead of the features of assembly 2100, 2200, 2300, 2400, and/or 2500).

In some embodiments, the connector strip 2602 of the assembly 2600 includes one or more engagement features configured to engage the supports 2638 (e.g., with engagement portion of the supports 2638). For example, the connector strip 2602 can include one or more protrusions 2680 (e.g., dimples). The protrusions 2680 can extend from the second face 2612b of the connector strip 2602. In some embodiments, the protrusions 2680 are formed by deforming the connector strip 2602 via methods such as punching. In some embodiments, the protrusions 2680 are attached (e.g., welded) to the second face 2612b of the connector strip 2602.

In some embodiments, the supports 2638 can include indentations 2682 configured to receive at least a portion of the protrusions 2680. Engagement between the indentations 2682 and protrusions 2680 can reduce or eliminate the risk of lateral (e.g., parallel to the second face 2612b) movement of the supports 2638 with respect to the structural member 2010 and/or building panel 2060. In some embodiments, at least one support 2638 is engaged by a fastener 2022 extending through the support 2638 and at least one support 2638 is engaged by a protrusion 2680. In some embodiments, none of the supports 2638 are engaged by a fastener 2022 and one or more of the supports 2638 are engaged by a protrusion 2680.

In some embodiments (not shown), the shear connector assemblies do not require trimming to a shorter length at a job site. In some embodiments, the shear connector assemblies can include one or more rows of elongated supports (e.g., bars or strips) separated by spaces (e.g., lateral spaces and/or lengthwise spaces). In some embodiments, the shear connector assemblies include one or more rows of a continuous support extending the entire shear connector assembly length. The insulative strip can include apertures to accommodate the elongated supports. In some embodiments, the insulative strip can comprise one or more narrow strips on one side, in between, or in an alternating arrangement with the one or more rows of supports. Fasteners used to secure the shear connector assembly to the structural member can pass through apertures in the supports or can be located to one side or in between the supports.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A shear connector assembly for attaching a structural member to a building panel; the connector assembly comprising:
 a connector strip comprising:
  a first strip face;
  a second strip face opposite the first strip face;
  a first strip end, a second strip end, and a strip length extending from the first end to the second end;
  one or more apertures extending through the connector strip in a direction perpendicular to the first strip face; and
  one or more hooked members extending from the first strip face; and
 one or more support members comprising:
  a first support face in contact with at least a portion of the second strip face;
  a second support face opposite the first support face and contacting the structural member; and
  a thickness in a direction perpendicular to the first support face,
 wherein the strip length extends substantially parallel to a length of the structural member, and
 wherein the second support faces of the one or more support members contact less than 75% of a surface area of a length of the structural member overlapped by the strip length.

2. The shear connector assembly of claim 1, wherein the connector strip comprises fiber reinforced composite material.

3. The shear connector assembly of claim 1, wherein the one or more support members have a thermal conductivity less than 1.0 W/m·° K.

4. The shear connector assembly of claim 1, wherein the one or more support members have a compressive strength parallel to the thickness direction greater than 1000 pounds per square inch.

5. The shear connector assembly of claim 1, wherein the one or more support members comprise cementitious material.

6. The shear connector assembly of claim 5, wherein the cementitious material has a density less than 130 pounds per cubic foot.

7. The shear connector assembly of claim 1, wherein the one or more support members comprise fiber reinforced composite material.

8. The shear connector assembly of claim 1, wherein the one or more support members have an aperture extending through the thickness of the one or more support members in a direction perpendicular to the support first face.

9. The shear connector assembly of claim 8, wherein one or more fasteners pass through the support aperture.

10. The shear connector assembly of claim 1, wherein the connector strip includes one or more engagement features extending from the second strip face toward the one or more support members, and wherein the one or more support members couple with a portion of the engagement features.

11. The shear connector assembly of claim 1, wherein the second support face is in substantially continuous contact with an exterior flange face of the structural member.

12. The shear connector assembly of claim 1, wherein the one or more hooked members extend from the first strip face inwardly such that the angle of the point of contact between the first strip face of the connector strip to the one or more hooked members is less than 90 degrees.

13. The shear connector assembly of claim 1, wherein the one or more apertures are further aligned with the one or more support members.

14. The shear connector assembly of claim 1, wherein a connecting member inserted into the one or more apertures is substantially embedded into one of the one or more support members.

15. The shear connector assembly of claim 1, wherein a head portion of a connecting member inserted through the one or more apertures is in substantial contact with the first strip face.

* * * * *